United States Patent
Hlatky et al.

(10) Patent No.: US 9,298,978 B1
(45) Date of Patent: Mar. 29, 2016

(54) OPTICAL FISH RECOGNITION

(71) Applicants: Joseph F Hlatky, Ellicott City, MD (US); Steven Dwight Thomas, Jr., Spokane, WA (US)

(72) Inventors: Joseph F Hlatky, Ellicott City, MD (US); Steven Dwight Thomas, Jr., Spokane, WA (US)

( * ) Notice: Subject to any disclaimer, the term of this patent is extended or adjusted under 35 U.S.C. 154(b) by 318 days.

(21) Appl. No.: 13/951,464

(22) Filed: Jul. 26, 2013

Related U.S. Application Data

(63) Continuation-in-part of application No. 13/802,773, filed on Mar. 14, 2013.

(60) Provisional application No. 61/641,888, filed on May 3, 2012.

(51) Int. Cl.
| | |
|---|---|
| *H04N 7/18* | (2006.01) |
| *G06K 9/00* | (2006.01) |
| *G06T 7/60* | (2006.01) |
| *G06K 9/62* | (2006.01) |
| *G06K 9/66* | (2006.01) |

(52) U.S. Cl.
CPC .......... *G06K 9/00369* (2013.01); *G06K 9/6267* (2013.01); *G06K 9/66* (2013.01)

(58) Field of Classification Search
CPC .................................................. G06K 9/00147
USPC ......................................................... 348/157
See application file for complete search history.

(56) References Cited

U.S. PATENT DOCUMENTS

| | | | |
|---|---|---|---|
| 6,459,372 B1 | 10/2002 | Branham | |
| 2004/0208343 A1* | 10/2004 | Golden et al. | ................ 382/110 |
| 2013/0223693 A1* | 8/2013 | Chamberlain et al. | ........ 382/110 |

OTHER PUBLICATIONS

"Fishing Spots" app, Wayback Machine capture dated Dec. 2011.
"Catchbook" app, Wayback Machine capture dated Apr. 7, 2012.
"Best Apps for Fishing" article, Forbes, dated Aug. 20, 2010.
Alsmadi et al., "Fish Classification Based on Robust Features Extraction From Color Signature Using Back-Propagation Classifier," Journal of Computer Science 7 (1):52-58, 2011, ISSN 1549-3636, 2011.
Restriction Requirement mailed Apr. 1, 2015 in parent U.S. Appl. No. 13/802,773.
Response to Restriction filed May 20, 2015 in parent U.S. Appl. No. 13/802,773.
Notice of Allowance mailed Aug. 26, 2015 in parent U.S. Appl. No. 13/802,773.
Specification, drawings, and claims as filed Mar. 14, 2013 in parent U.S. Appl. No. 13/802,773.

* cited by examiner

*Primary Examiner* — Hee-Young Kim

(57) ABSTRACT

Example techniques are disclosed for performing optical recognition of fish. For example, image features can be extracted from an image of a fish and used in conjunction with location or time information to determine a species of the fish. The classification can be performed with one or more trained classifiers that are trained using training images of fish having labels indicating species of the fish.

20 Claims, 10 Drawing Sheets

520
Reporting menu:

Species option 521
- Brook Trout
- Cutthroat Trout

Size Option 522
- 8-10"
- 10-12"
- 12-14"
- 14-16"

Lure option 523
- Spinner
- Terrestrial
- Nymph

FIG. 6A

520
Reporting menu:

Species option 521
- Largemouth Bass
- Crappie

Size Option 522
- 8-12"
- 12-16"
- 16-20"
- 20-24"

Lure option 523
- Crankbait
- Plastic Worm
- Spinnerbait

FIG. 6B

OPTICAL FISH RECOGNITION

I. PRIORITY

This application is a continuation-in-part of, and claims priority to, U.S. patent application Ser. No. 13/802,773, filed Mar. 14, 2013, which claims priority to U.S. Provisional Application No. 61/641,888, filed May 3, 2012, both of which are incorporated herein by reference in their entirety.

II. BACKGROUND

Recent developments in electronics and data processing have given users the ability to conveniently store and communicate data from many different locations. For example, applications can allow users to keep track of their activities and share information with others. However, such technologies have not been broadly adopted in contexts such as fishing and hunting. Furthermore, data about outdoors experiences has not efficiently been leveraged into knowledge that can be used to enhance future outdoors experiences or learn about behavior of wild animals or fish.

In addition, users in different locations may want to adopt different tactics or approaches to outdoor activities depending on where they are. For example, an angler in one location may be better served using a particular type of lure than an angler in a different location. As another example, a hunter in one general geographic area may be better served hunting at a particular elevation, whereas a hunter in a different geographic area may be better served hunting at a different elevation. Traditionally, anglers and hunters might use a trial-and-error approach to learn the best way to fish or hunt a particular area.

III. SUMMARY

Consistent with the invention, there is provided a computing device that can include at least one processing device and at least one memory device or storage device storing computer-readable instructions. When executed by the processing device, the computer-readable instructions can cause the at least one processing device to obtain a target image of a first fish. The target image can have corresponding target image features. The computer-readable instructions can also cause the at least one processing device to obtain target location information corresponding to a target location where the first fish was caught, and to determine a first species of the first fish based on the target image features and the target location information.

IV. BRIEF DESCRIPTION OF THE DRAWINGS

The accompanying drawings show certain aspects of the present inventive concepts.

FIGS. 5A, 5B, 6A, and 6B show example graphical user interfaces consistent with certain embodiments of the invention.

Figure 7:
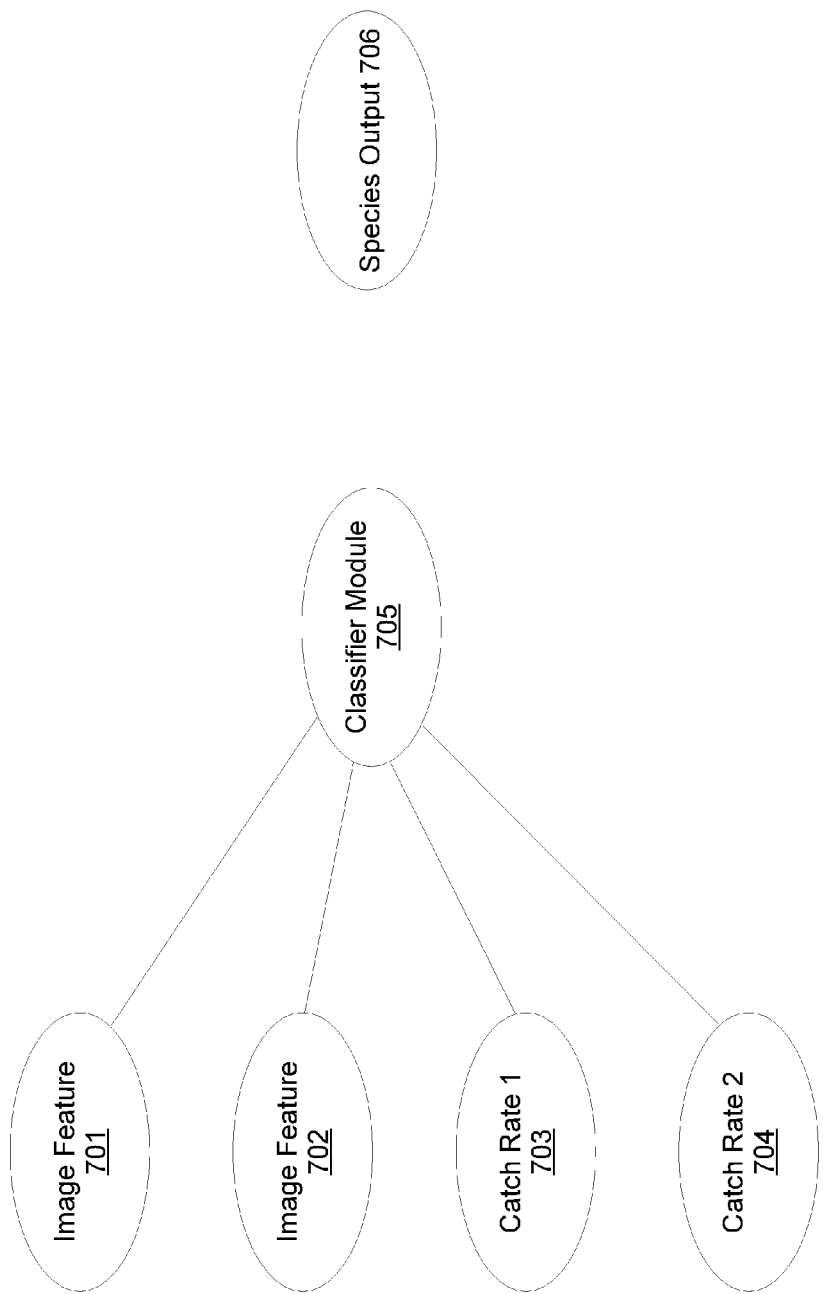
Figure 9:
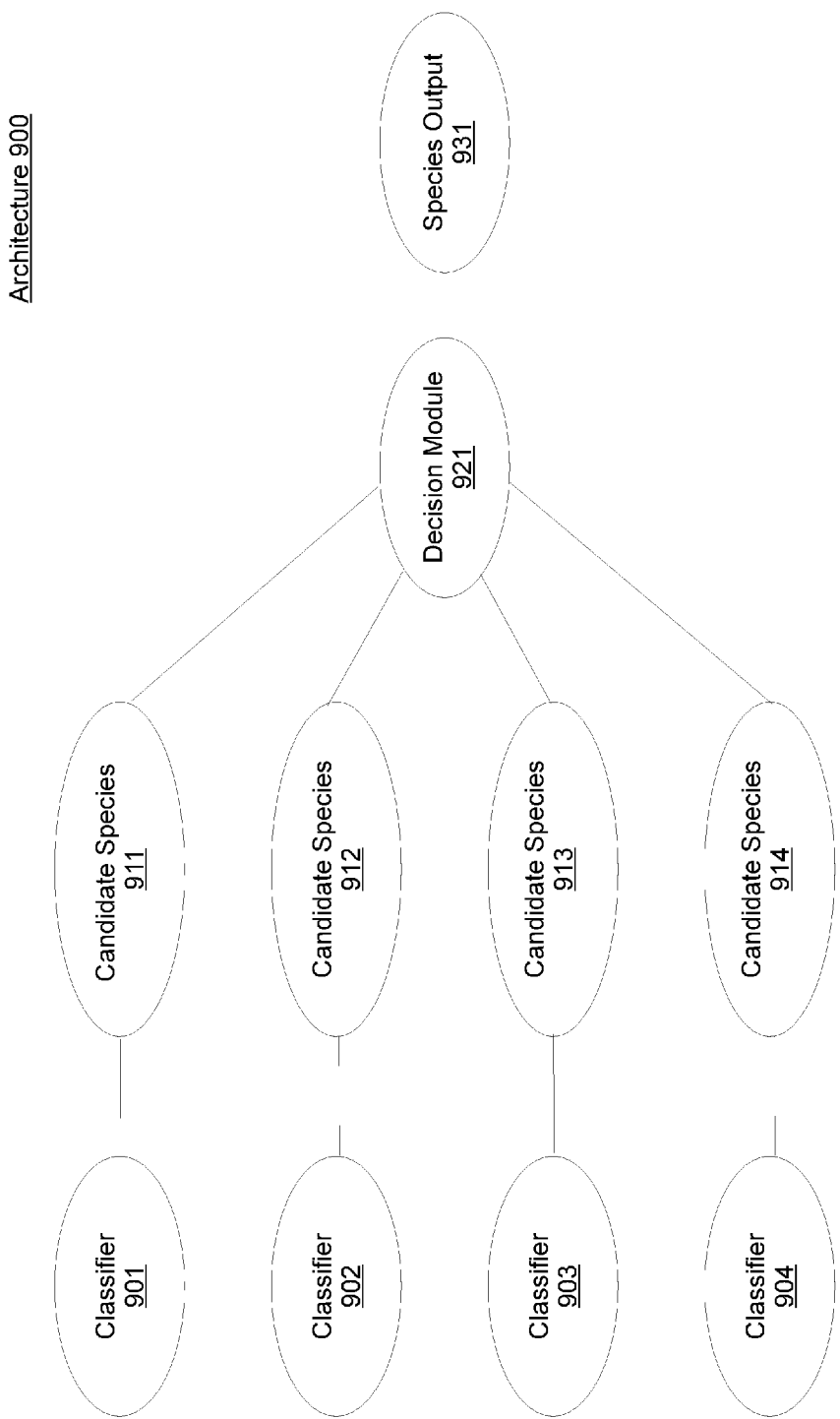

FIGS. 7 and 9 show example classification architectures consistent with certain embodiments of the invention.

Figure 8:
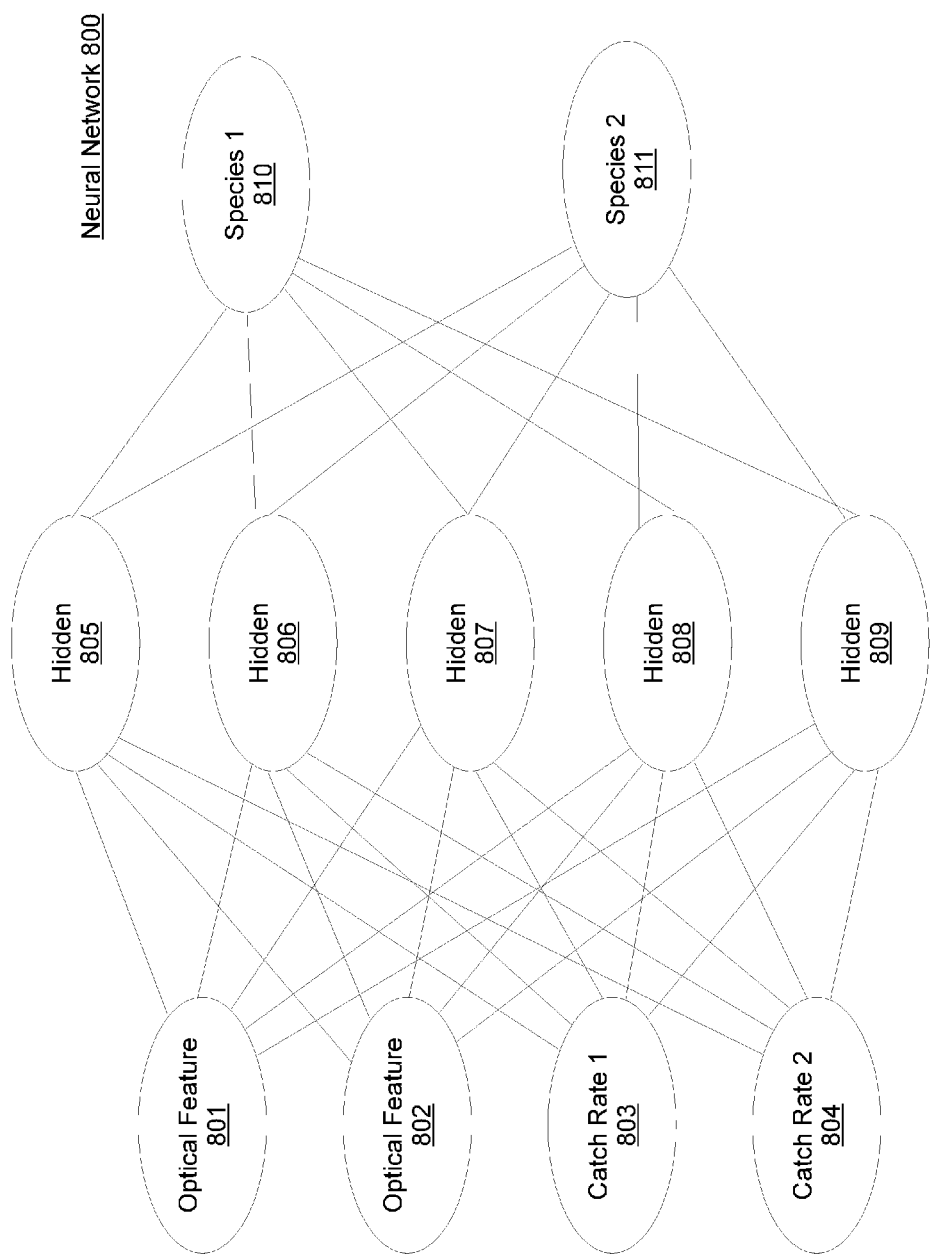

FIG. 8 shows an example classifier consistent with certain embodiments of the invention.

V. DETAILED DESCRIPTION

Generally speaking, the embodiments disclosed herein can provide a user with information related to pursuing outdoor activities. The disclosed implementations generally fall into two categories, (1) fishing and (2) hunting. In both cases, user devices can receive information, such as recommendations, related to pursing outdoor activities where the user is currently located. Note that the term "hunting" is used broadly herein to mean searching for wild animals on land, e.g., mammals, birds, etc. Thus, hunting as used herein includes activities such as scouting for animals outside of hunting season, bird watching, and/or simply traveling in nature with the intent to observe land animals or birds in their natural habitat.

System Example

Figure 1:
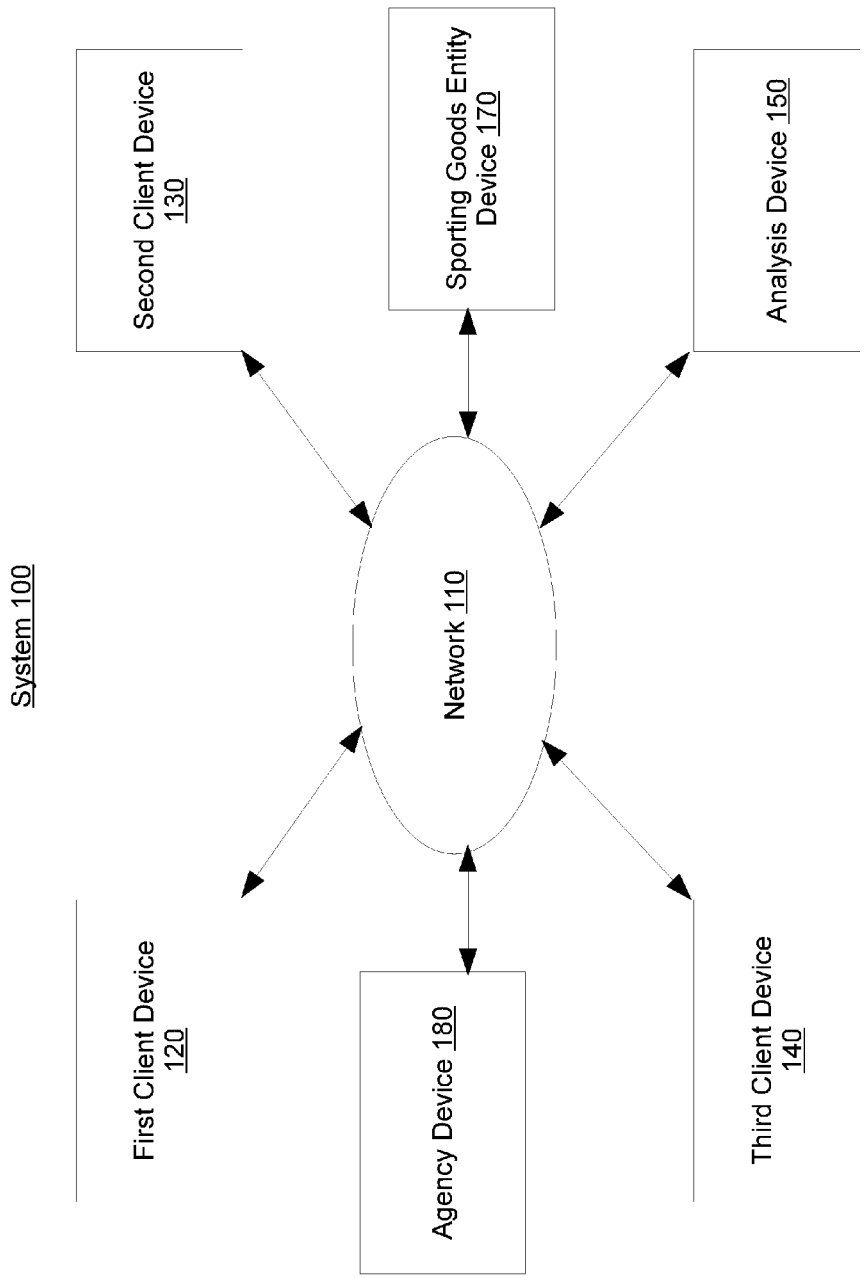
FIG. 1 is a block diagram of a system consistent with certain embodiments of the invention.

FIG. 1 is an example of a system 100 that can be used in some implementations. System 100 can include a network 110 connecting client devices 120, 130, and 140 as well as an analysis device 150, agency device 160, and sporting goods entity device 170. Network 110 can be, for example, a wired or wireless electronic communications network, e.g., a WAN, LAN, the Internet, an intranet, etc. Furthermore, communications network 110 can include one or more cellular networks, e.g., in instances where one or more of the devices communicates via cellular communication. Note that references herein to communications with various agencies (Fish and Game, Department of Natural Resources, NOAA, etc.) refer to communicating with agency device 160 (of which there may be one or more per agency). Likewise, references herein to communications with sporting goods entities such as tackle shops, fishing guides, etc. refer to communicating with sporting goods entity device 170.

Client devices 120, 130, and 140 can be devices suitable for use by individuals, e.g., mobile devices such as cell phones, PDAs, tablets, netbooks, as well as laptops or personal computers. As discussed more below, each client device can have one or more processing devices as well as one or more memory devices and/or storage devices comprising instructions to cause the processing device(s) to perform the functionality described herein with respect to the client devices, as well as network communications ability. In some instances, analysis device 150, agency device 160, and/or sporting goods entity device 170 can be similar to any of the client devices, e.g., a mobile device, laptop, or personal computer. In other instances, devices 150-170 can each be a server-class computing device.

Some implementations disclosed herein relate to a client-server model, where analysis device 150 is a server that performs certain processing disclosed herein. However, some implementations can also use peer-to-peer techniques to distribute processing across individual client devices. In such implementations, the processing disclosed herein with respect to analysis device 150 can be performed by a single client device and/or distributed across multiple computing devices. In further implementations, the processing disclosed herein as performed by the analysis device can be performed wholly on an individual client device. Thus, the term "analysis device" refers to any device performing analysis/classification techniques as discussed herein, including any device implementing part or all of an analysis engine as discussed more below.

Generally speaking, the analysis device can obtain fishing or hunting data, e.g., from various client devices and/or servers having information such as weather data, hydrologic data, etc. Fishing data can include catch reports, e.g., can identify fish caught at locations of the client devices, fishing techniques used, etc., as well as the location where the fish were caught. Likewise, hunting data can identify animal sightings, e.g., via trail cameras or in person by users of the client devices (including hunting kills). The analysis device can process the fishing or hunting data to train an analysis engine, e.g., using a neural network, regression, or other mathematical or machine learning technique. Then, the analysis device can receive a geographic location from a client device requesting an analysis of fishing or hunting at the received location, and can send an analysis of fishing or hunting at the received location to the requesting client device.

For example, the analysis can provide a recommendation of how to hunt or fish at the received location, how relatively "good" the hunting or fishing is likely to be, species or size of fish that are likely to be caught in an area near the received location (e.g., closest body of water, closest public land, etc.). Thus, the analysis device can provide analyses that are based on hunting or fishing data provided by multiple other client devices and that are not necessarily derived from fishing or hunting data that is obtained at the location provided by the requesting client device.

In some implementations, rule-based recommendations are also provided directly based on stored rules. Generally speaking, the analyses disclosed herein as learned by the analysis engine can also be provided by hard coded rules that can be applied directly without querying the analysis engine. Such rules can also be obtained from outside sources, e.g., experts, and stored on the analysis device (including a client device performing analysis functionality disclosed herein).

In further implementations, the recommendations provided by the analysis engine can be constrained to comply with certain legal requirements. Also note that some recommendations may be obtained by data mining contemporaneous fishing reports for particular fishing locations. Note that the term "fishing report" as used herein can include fishing reports such as those published by tackle shops, magazines, tackle manufacturers, etc. which may generally characterize fishing conditions, e.g., in a given area at a given time. "Catch report" as used herein includes instances where users of various client devices report actually catching fish at a given location, e.g., without necessarily publishing the information to the public at large as is often the case for fishing reports. "Animal report" as used herein includes instances where users of various client devices report sightings of animals (generally birds or mammals) on land or in the air at a given location (or sightings obtained from trail cameras). Animal reports can include reports of hunter success, reports of hunters or other individuals that see (and/or take pictures of) animals in nature, and pictures from unmanned trail cameras. The term "submitted report" refers to a catch report or animal report submitted by a user of a client device, trail camera, etc. Submitted reports often include pictures of the fish caught and/or animals sighted.

Fishing Examples

In some implementations, an angler can receive analysis on their client device such as a recommendation for how to fish an area where the angler is currently located. For example, if an angler is fishing on the St. Joe River, Idaho in mid-August, there has not been any recent rain, the water is relatively low and warm, these conditions may indicate the user should try a terrestrial fly such as a large foam grasshopper. Conversely, if the user is fishing the Shaver's Fork river, West Virginia in mid-March, these conditions may indicate the user should try a nymph, e.g., prince nymph, pheasant tail, etc.

As mentioned above, the recommendations can also be directly rule-based. For example, rules can be stored for specific locations, e.g., the analysis device can store data identifying the St. Joe River as well as recommendations for fishing the St. Joe River at a particular time of year, under particular weather/water conditions, times of day, etc. In other implementations, the recommendations can be derived by analysis of fishing data contributed by other anglers. For example, mathematical and/or machine learning algorithms can be applied to the fishing data to identify recommended lures/flies, retrieval speeds, fishing depths, sinker weights, line types (floating, sinking, braided, monofilament), line strengths (rated in lbs. test for conventional fishing line, fly line weights (e.g, 6 weight), tippet weight (e.g., 6×), etc. The mathematical and/or machine learning algorithms can be applied by the analysis device, e.g., embodied as a server. In other implementations, the analysis device is embodied as a client device, e.g., one or more client devices perform the mathematical and/or machine learning algorithms or direct application of rules disclosed herein. For example, distributed/grid computing techniques can be used to perform individual parts of the mathematical and/or machine learning techniques on individual client devices.

In some implementations, the fishing data is provided by anglers at multiple different locations (e.g., different streams, lakes, rivers, bays, oceans, etc.). The mathematical and/or machine learning techniques can be applied to characteristics of the multiple different locations to determine one or recommendations for an angler at an individual location. For example, the mathematical and/or machine learning techniques could learn, infer, or discover that locations with relatively low, warm water tend to fish well with terrestrials such as grasshopper imitations. Thus, an analysis sent to an angler fishing an area with relatively low, warm water could recommend the angler use a terrestrial or even a specific grasshopper pattern. This can be the case even if there is no fishing data for angler's particular location. Rather, the recommendation to use a grasshopper for low, warm water can be learned, inferred, or discovered from fishing data for other locations, e.g., other locations where other anglers caught fish using grasshoppers or other terrestrials in low, warm water and provided catch reports identifying the locations, lures, and fish that were caught. In an example discussed below, the analysis engine is embodied as a neural network.

Figure 2:
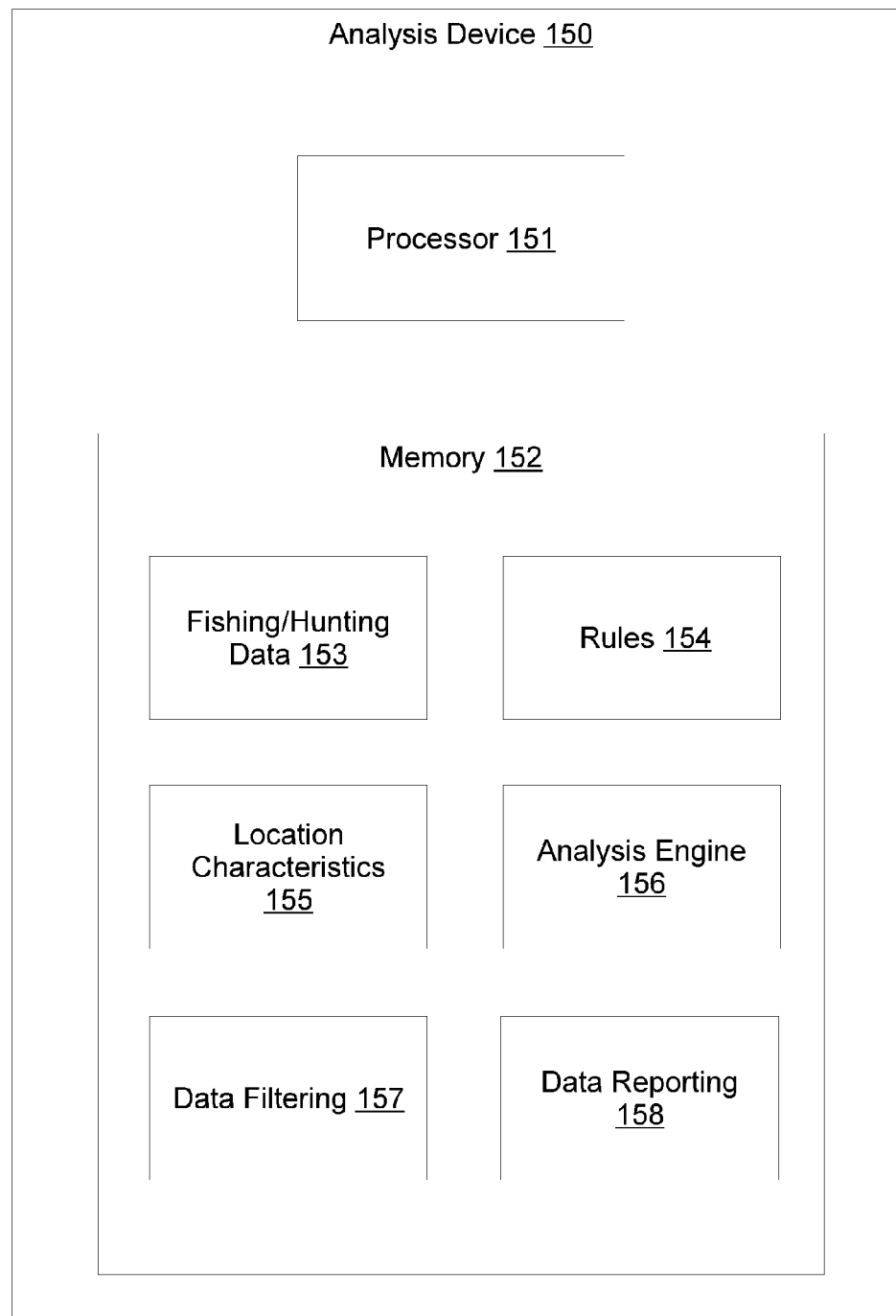
FIG. 2 is a block diagram of a computing device or processing device consistent with certain embodiments of the invention.

FIG. 2 illustrates an exemplary configuration of analysis device 150. Analysis device 150 can include a processor 151 and a memory 152. Memory 152 can include one or more memory devices such as various forms of RAM. In some implementations, analysis device can also include storage such as optical storage devices, hard drives, flash drives, etc. Although not shown in FIG. 2 the analysis device can also include or be configured to control one or more peripheral devices such as displays, keyboards, mice, etc. Note also that the functionality disclosed herein can be performed using system-on-a-chip techniques and/or dedicated circuitry (e.g., FPGAs and/or ASICs).

Memory 152 can also include fishing/hunting data 153, rules 154, location characteristics 155, analysis engine 156, data filtering functionality 157, and data reporting functionality 158. In some implementations, components 156-158 are embodied in the memory as computer-readable instructions that are read from storage into the memory for execution by the processor. In some instances, the processor is a general-purpose processing device that is configured, by the instructions, to become a special-purpose processing device. Components 153, 154, and/or 155 can be embodied as data, e.g., in a relational database, spreadsheet, object-oriented database, csv, or other suitable format for processing by the analysis engine.

Generally speaking, client devices 120, 130, and/or 140 as well as devices 160 and/or 170 can also include hardware such as the aforementioned memory, processor, etc. Furthermore, client devices 120, 130, and/or 140 can include an outdoors application (e.g., a hunting or fishing "app") that performs various functionality discussed herein such as obtaining pictures of fish/animals and sending catch reports and/or animal reports to analysis device 150. Devices 160 and/or 170 can include functionality to register to receive fishing/hunting reports and/or results of analysis from the client devices and/or analysis device, perhaps by providing criteria to the client and/or analysis devices indicating what reports/analyses they would like to receive.

Method Example

Figure 3:
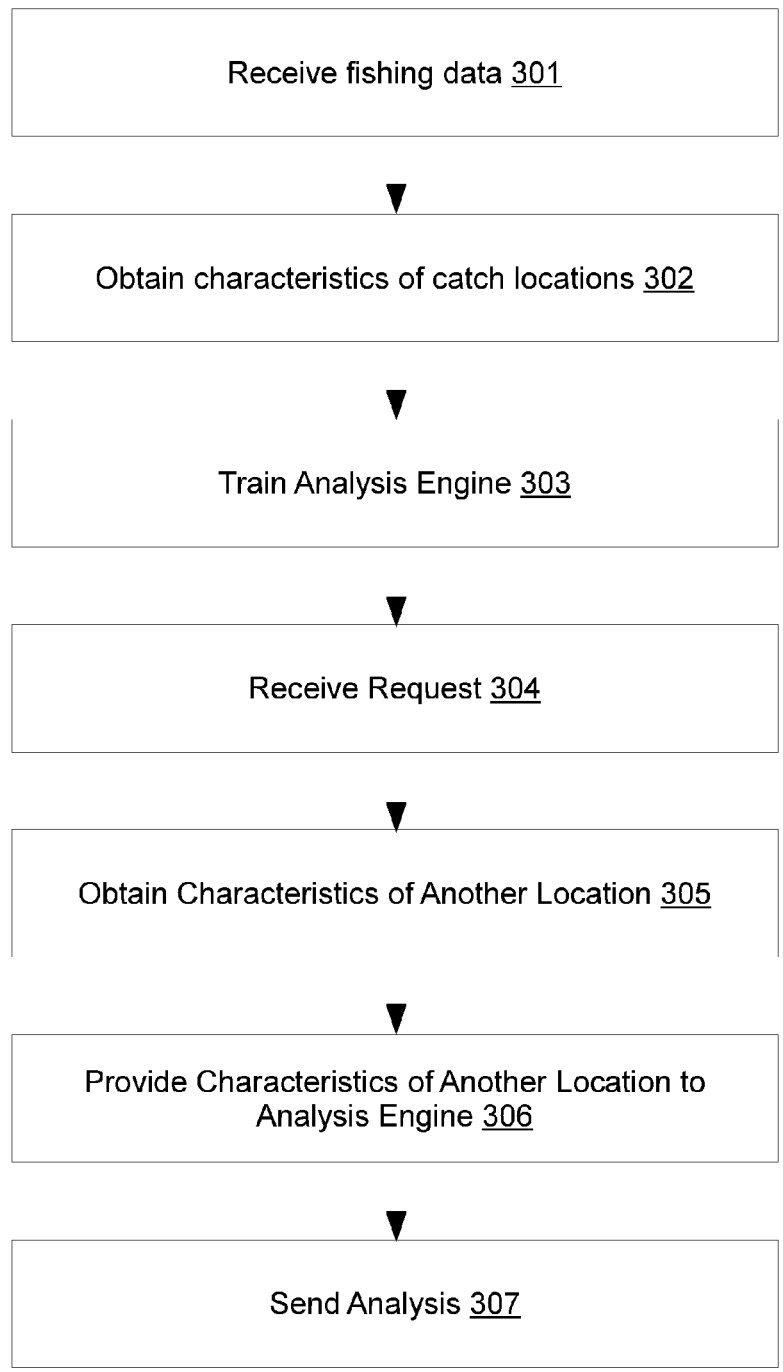
FIGS. 3 and 10 are flow charts of exemplary methods consistent with certain embodiments of the invention.

FIG. 3 illustrates an exemplary method 300 consistent with certain embodiments. Generally speaking, FIG. 3 shows a method 300 for providing a user with a fishing analysis. Method 300 can be performed using analysis engine 156.

Method 300 begins at block 301, where fishing data is received. For example, first client device 120 and second client device 130 can send fishing data identifying various fish that are reported as having been caught by a user of client device 120 and a user of client device 130. Note that many other client devices can also provide fishing data at block 201. Also note that some users may report fish caught by other individuals, e.g., fishing partners, guides, etc., and thus the fishing data is not necessarily received from the user who caught the fish. The fishing data can also identify other information, such as a type of lure used to catch the fish, a depth the anglers were fishing at, a lure retrieval speed, etc. The fishing data can also identify catch locations, e.g., locations where the fish were caught. For example, the first or second user's latitude, longitude, and/or elevation can be identified by the fishing data, e.g., by a GPS or other location application (e.g., cellular-based) on the first and/or second client devices. The fishing data can also identify the time of day and date when each fish is caught. Note that if users submit their fishing data to the analysis device immediately after catching fish, the time of day and/or date can be inferred. However, since some locations do not have cellular access, other implementations may time and location stamp the fishing data, which can be submitted to the analysis device when connectivity with the analysis device is available.

Next, at block 302, characteristics of the catch locations are obtained. For example, the locations where the first and second users caught the fish can be used to obtain information about the catch locations. If one user's location indicates they are fishing the St. Joe River in Idaho near the town of Avery, other information can be obtained such as current water conditions—water temperature, cubic feet per second of water flow, clarity (muddy, clear, etc.). Note that, in some implementations, characteristics of the catch locations are provided directly by the client devices with the fishing data. In other implementations, the analysis device may use the received locations of the client devices to obtain the characteristics of the catch locations, e.g., by accessing other devices (not shown). For example, the analysis device may electronically obtain fishing reports, streamflows, weather information, etc. for the locations identified by the fishing data from various servers hosting the fishing reports, streamflows, weather information, etc.

Next, at block 303, the analysis engine is trained. For example, various mathematical and/or machine learning algorithms can be applied to the fishing data as well as the characteristics of the catch locations. In one specific example shown in more detail below, an artificial neural network is trained using the fishing data and the catch location characteristics. In other examples, support vector machines, genetic algorithms, regression techniques, etc. can be employed at block 303.

Next, at block 304, a request is received from a client device. For example, the third client device 140 can request a fishing analysis for a current location of the client device 140. The location can be identified in the request, and can include latitude, longitude, elevation, etc., obtained by a location application on the third client device 140.

Next, at block 305, characteristics of the received location are obtained. For example, a current fishing report, streamflows, current (or recent) weather, etc. for the received location can be obtained, e.g., from another device, e.g., one or more web servers. Alternatively, the third client device 140 can obtain the location characteristics and provide the location characteristics directly to the analysis device. In either case, the characteristics can include stream flows in cfm, water temperature, clarity, fishing reports, weather information, etc.

Next, at block 306, the characteristics of the received location are provided to the analysis engine to obtain an analysis of fishing at the received location. For example, the third user's current location and location characteristics may be used as inputs to the trained analysis engine. The mathematical and/or machine learning technique can used to output an analysis. For example, the aforementioned neural net can be used to recommend a particular type of fly, e.g., a terrestrial.

Next, at block 307, the analysis is sent to the requesting device. In some implementations, one or more of the rules can also be applied at block 307. For example, if the requesting client device is located in an area where certain types of lures are prohibited, other types of lures can be recommended instead. For example, if the analysis engine suggests a "spinner" such as a Mepps® or Rooster Tail® as the highest-ranked recommended lure but the user is in a fly-fishing only area, the highest-ranked fly can be recommended instead, e.g., even though the analysis engine may have ranked the spinner higher than the fly.

Example Analysis Engine

Figure 4:
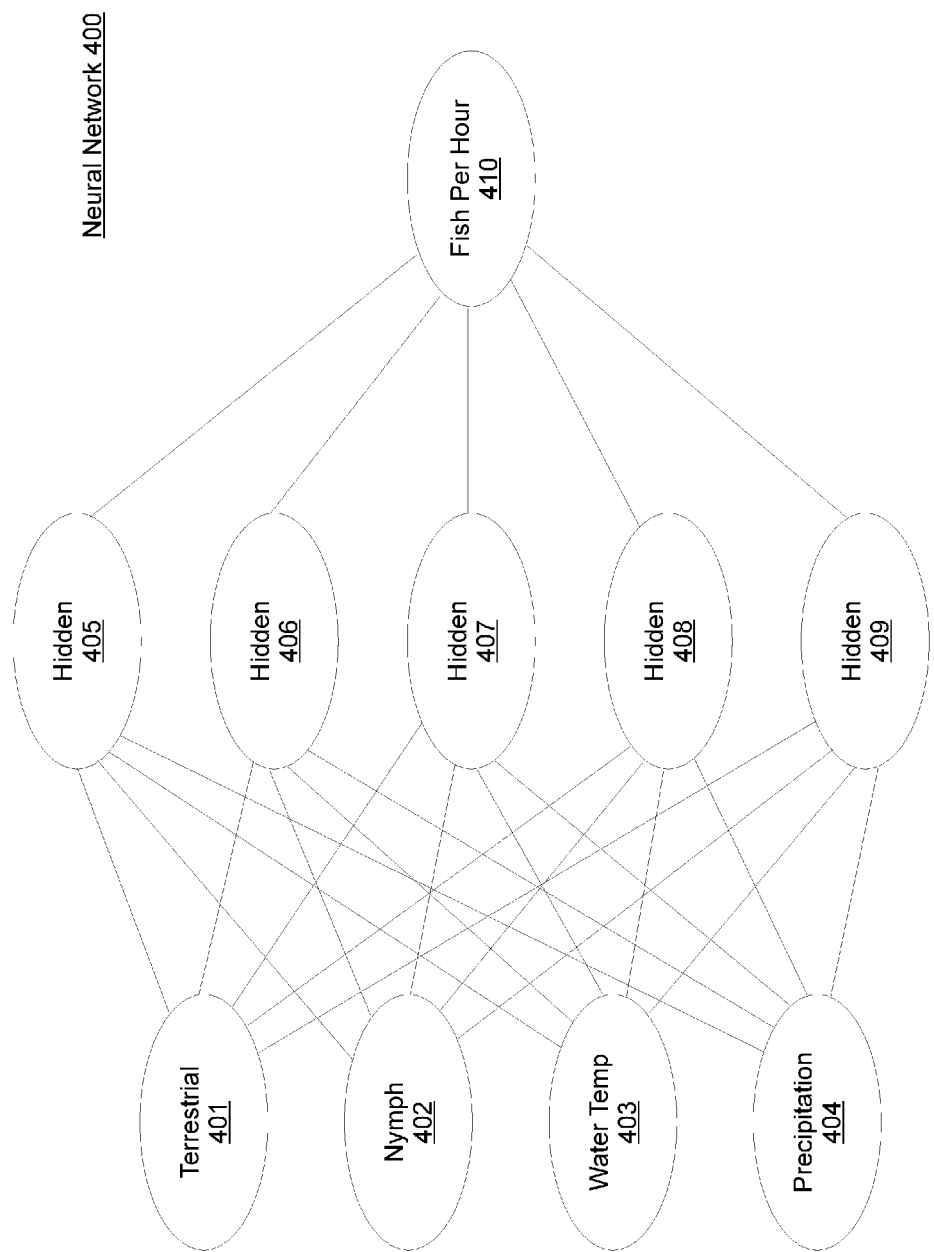
FIG. 4 is an example of an analysis engine configuration consistent with certain embodiments of the invention.

FIG. 4 illustrates an exemplary implementation of the analysis engine embodied as a neural network 400. Neural network 400 can be used, for example, to generate the analysis sent to the requesting user at block 307 of method 300. Note that neural network 400 is shown as a relatively simple network for exemplary purposes and for ease of exposition, e.g., relatively few inputs and one real-valued output are shown. Additional implementations of inputs, outputs, processing logic, etc. are discussed further below.

Neural network 400 includes four input nodes, including three Boolean nodes, Terrestrial 401, Nymph 402, and Precipitation 404, as well as a real-valued input node Water Temp 403. Neural network 400 also includes 5 hidden nodes 405-409 which are part of a hidden layer of the neural network used for training and querying the neural network. Neural network 400 includes one output node, Fish Per Hour 410, which the neural network learns as a function of the values of the input nodes.

In this example, the terrestrial node represents instances where users reported using a terrestrial fly such as a grasshopper, beetle, bee, fly, ant, etc. as part of the fishing data received at block 301. Likewise, the nymph node represents instances where users reported using a nymph such as a prince nymph, hare's ear nymph, stone fly nymph, etc. The output node 410 represents the number of fish per hour the users reported catching using a nymph or a terrestrial. Water Temp 403 can represent the water temperature when the user was fishing. Precipitation 404 can represent whether or not it was precipitating at the time the user was fishing.

Training the neural net using data provided from the first client device and the second client device can be performed as follows. If the first user caught 3 fish per hour using a terrestrial, the first two inputs to the neural net would be (1, 0) and the output would be 3, e.g., for a first training record that reflects the fishing data reported by the first client device. If the second user caught 1 fish per hour using a nymph, the first two inputs would be (0, 1) and the output would be 1, e.g., for a second training record that reflects the fishing data reported by the second client device.

The values for the first and second training records for nodes 403 and 404 can be location characteristics that are obtained directly from the respective client devices or, alternatively, can be retrieved based on a time and location reported by a given user. For example, if the first user reports catching the 3 fish on the St. Joe River in Idaho near Avery at 3 PM on Mar. 3, 2012, then this information can be used to retrieve historical weather data (e.g., by querying a weather server) from a weather log to populate input node 404, e.g., with a "1" if it was snowing or raining while the user was fishing and a "0" otherwise for the first training record. Likewise, hydrologic data sources can be used to populate the input node 403 with the water temp when the first user was fishing, e.g., by querying a hydrologic data source. Water temperature and precipitation inputs can be retrieved for the second user in a similar fashion for the second training record.

In the example discussed above, the data provided by the first and second users can be used to train the neural network. Once the neural network is trained, the neural network can be used to generate analyses by querying the neural network. For example, a third user (e.g., of the third client device) can be at a particular location, even a location for which no fishing data has been previously submitted. Weather and hydrologic data sources can be queried to determine values for inputs 403 and 404 for the third user's location. Then, the network can be queried first with (1, 0, current water temp, current precip) to obtain a predicted number of fish caught per hour with a terrestrial, and again with (0, 1, current water temp, current precip) to obtain a predicted number of fish caught per hour with a nymph. If the predicted number of fish caught with the terrestrial is higher than the predicted number for the nymph, the third user can be sent a recommendation to fish with a terrestrial. Conversely, if the predicted number for the terrestrial is lower than the predicted number for the nymph, the third user can be sent a recommendation to fish with a nymph.

Additional Inputs and Outputs

The examples discussed above are but a few of the possible inputs that can be used with the disclosed implementations. Generally speaking, the inputs to the analysis engine can include fishing data obtained from users and/or location characteristics. For example, the fishing data, e.g., provided by the client devices, can identify the length, weight, species, sex, color (or "freshness" e.g., for salmon, silver being relatively more fresh than red/pink) of fish caught by the users. The fishing data can also identify the depth the users fished at, whether the users fished in a pool or a riffle, near a certain type of structure (tree stump, pier, bridge, shipwreck, etc.), miles offshore (e.g., ocean fishing), etc. The fishing data can also identify additional information about the lure used to catch a particular fish, e.g., color, size, method of presentation (drift, slow retrieve, fast retrieve, etc.). For fishing flies, the size can be represented as a number, e.g., size 12 prince nymph, size 16 ant, etc. For other types of lures, e.g., crankbaits, the lure size may be represented in ounces. Note also that some fishing lures may have a particular associated model name that may be used as well. For example, a fishing application on the client device may provide various menus that can be used to input the various data items mentioned above and submit these data items with the catch reports to the analysis device 150.

In addition, the time of day when the fish are caught, the time of year, phase of the moon, barometric pressure (and/or simply a Boolean value indicating rising or falling pressure), salinity of the water, pH, tidal conditions (incoming, outgoing, high tide, low tide) may all provide useful information for training the analysis engine 150. As mentioned above, these inputs can be provided by the client devices directly or, alternatively, retrieved by the analysis device from other data sources such as various servers (not shown in FIG. 1) that host hydrologic, weather, tidal, solar, lunar, or other types of data. Additionally, historical data can also be used as inputs. For example, the weather for previous days can also be used as inputs. For example, for each catch report, the previous three days high, low, and/or average temperatures, whether or not there was precipitation, etc. can be used as training inputs. These inputs can uncover situations where, for example, it may be particularly productive to fish in the rain on the first day of rain after three days of sunshine, but less productive to do so on a fourth consecutive day of rain. As another example, snowpack levels in a drainage can be used as an input. For rivers that are fed by higher-elevation tributaries, the combination of snowpack levels with recent weather data can help uncover circumstances where a river may be "blown out" by water that is rising or is too high for good fishing. Some implementations may also use one or more inputs that characterize fishing pressure, e.g., number of catch reports from a particular stream, number of people living within a 50-mile radius, etc.

As mentioned above, the analysis engine can be trained to output a predicted number of fish per hour that will be caught with a particular type of lure under particular conditions. In other implementations, the analysis engine can be trained to perform a classification task, e.g., classifying certain fishing conditions as either "nymph" or "terrestrial" fishing conditions. Note that other implementations can provide more refined recommendations, e.g., recommending specific fly patterns, lure sizes, fishing depths, presentation styles, etc. In such implementations, the recommendations provided by the analysis engine can identify a particular class of lures selected by neural net or other algorithm.

Also note that fish per hour is but one metric that can be used as an output of the neural network. As another example, users of the first, second, and other client devices could simply rate their fishing experiences on a scale of 1-5, e.g., at a particular location on a particular day. The neural network can be trained to predict how the user of the third client device would rate their fishing experience as mentioned above at that location or a different location on another day, e.g., by setting an output node to the ratings applied by users for training purposes and querying the trained network to determine what values the output node produces for specified conditions. In further implementations, e.g., commercial fishing implementations, catch rates in pounds per hour, per day, etc., can be used. Such catch rates may be defined for legal catches (e.g., excluding fish that cannot be kept either commercially or recreationally). Further implementations may consider the poundage and/or value of fish that actually arrive at a dock in saleable condition, e.g., some fish, crab, lobster, or other crustaceans may need to be alive to have value to commercial fisherman. The disclosed implementations may capture the extent to which salinity, temperature, oxygenation, weather, etc., influence how successful commercial fisherman are at not only catching high poundages of legal fish, but also the survival rates of said legal fish. Note the term "fish" as used herein can include any aquatic animal, including crustaceans.

Also note that some implementations may require very little effort for users to report their fishing data. A client device can simply request that a user rate their fishing experience on a scale of 1-5, estimated fish caught per hour, size of fish caught, etc. without any other user input. The location and time can be determined automatically by the client device and sent to the analysis device. Once the analysis engine is trained, the third client device can receive a recommendation about how good the fishing is likely to be at another time, e.g., at a location for which fishing data has or has not been reported. Because such implementations may not have users reporting training data for fishing techniques (e.g., lures, depth, retrieval speed, etc.) the analysis engine may not be able to learn fishing techniques just from this limited type of fishing data. However, rules-based approaches can be used to recommend fishing techniques for the user's location, e.g., based on tackle shop, magazine, or other existing recommendations. In such an implementation, the analysis engine can predict how good the fishing is likely to be while using a rules-based approach to recommend how the user should fish.

Some implementations may also use previous fishing reports as fishing data. For example, assume a fly shop reported "Excellent fishing on May 10, 2010 using nymphs on the St. Joe." This fishing report can be parsed to characterize the fishing, e.g., excellent could correspond to a rating of 5, historical weather conditions, streamflows, etc, can be obtained for May 10, 2010, and the analysis engine can be trained using such a historical fishing report.

Analysis Examples

In the examples above, certain analyses were based on a number of fish per hour without necessarily accounting for characteristics of the particular fish that were caught, e.g., size, species, etc. In some implementations, users may wish to pursue a particular species of fish, e.g., a user fishing the St. Joe may prefer catching cutthroat trout and not be interested in brook trout. Such a user may prefer a cutthroat-specific recommendation. One way to provide such a recommendation is to train a neural network such as network 400 using only data for cutthroat trout. For example, fishing data reported by users can be filtered to identify only cutthroat catch reports, which can then used to train the neural network with cutthroat-specific training data. Alternatively, the inputs to the analysis engine can specify the species, e.g., using a 1 of N technique (having an input node for each species, each training iteration setting a single one of the species nodes to 1 and the remaining species nodes to 0). Thus, users can be provided an option for a species-specific recommendation. This can be useful where particular species of fish may have particular preferences, e.g., if cutthroat tend to prefer terrestrials and brook trout tend to prefer nymphs, the analysis engine may learn these tendencies over time if trained separately with filtered fishing data for the two different species or if inputs are used to distinguish the two species in the training data.

In the case of migratory fish, note that it can be beneficial to provide fish counts for various locations to the analysis engine. For example, many state fishing agencies track, day by day, the number of fish that pass through certain sections of a river. The analysis engine can use these numbers as inputs, e.g., with the relative distance from the locations of the catch reports, in providing recommendations for users. For example, inputs could identify that the fish counts at a particular dam were 10,000 fish one week ago and that the dam is 40 miles from the fishing location. These sort of inputs can be helpful for "intercepting" migratory fish. Further implementations may allow a user to purchase a fishing license via a user interface shown on the client device and also submit legally-required catch reports directly to a regulatory agency. Often, regulatory agencies such as state fisheries agencies have mandatory reporting requirements for certain types of fish. In this case, the analysis device can gather any of the other data mentioned herein (e.g., from weather servers, hydrologic servers, etc.) and provide this information to the agency server with the catch report. Thus, the agency can get much more detailed information than would typically be the case for a paper mandatory catch report, which may only have a rough location, species, and time. In some implementations, users may be able to submit their mandatory catch reports to state agencies using a client fishing application that also processes the mandatory catch report as discussed herein for other catch reports.

In further implementations, the client devices may be configured with an identifier of a locally-stored fishing license (e.g., a GUID). In some cases, the client device can be configured to share the identifier with another client device (e.g., of a game warden) via short-range wireless communication (e.g., bluetooth). This can allow the game warden to check the user's license even in situations where there is no cellular connectivity.

In some implementations, "trophy" fishing recommendations can be provided by the analysis. For example, some anglers may only wish to catch relatively large fish and, in fact, may view catching relatively large numbers of small fish as a nuisance. Again, filtering training data to train the analysis engine to perform a trophy-specific analysis can be useful to provide recommendations for such users, or, alternatively, inputs can be used to represent the size of the fish. In the case of a cutthroat trout, a cutoff of 14 inches might be considered reasonable. The analysis engine can be trained with filtered training data for fishing data identifying cutthroat over 14" and can be trained again for smaller fish, a Boolean input node can be used to identify whether a fish exceeds this trophy cutoff, etc. Thus, the analysis engine may be trained to identify a pattern, e.g., where larger fish prefer nymphs and smaller fish prefer terrestrials, etc.

Some recommendations may also recommend particular lure sizes, fishing depths, lure colors, retrieval methods, etc. For example, the users may report fly sizes with their fishing data which are then used to train the analysis engine. Thus, the analysis engine can make a recommendation such as "size 14 prince nymph" to a requesting user. The analysis engine can choose the size to recommend using a similar technique as mentioned above, e.g., checking predicted catch rates (or sizes) for different lure sizes and choosing the size with the higher catch rate/size for the recommendation. For example, the analysis engine could compare the predicted catch rates for size 14 vs. size 16 prince nymphs and recommend the nymph size with the higher predicted catch rate/size.

Note also that, in some implementations, users can query the analysis engine. For example, the user can provide a query to the analysis device requesting information about the relative strength of three different lures, e.g., a terrestrial, a nymph, and an emerger (e.g., via a user interface displayed on the client device). The analysis engine can provide a recommendation that identifies the relative strength, e.g., in fish per hour for each of the lures identified by the query. For example, the analysis engine might respond to the query with values (3.0, 2.1, 1.4) indicating the user is expected to catch 3 fish per hour with a terrestrial, 2.1 fish per hour with a nymph, and 1.4 fish per hour with an emerger. Such information can also be provided to the user in the absence of an explicit query.

As another example, the user could query the analysis engine for how good the fishing is likely to be at times and/or locations identified by the user. For example, the analysis engine can predict the fishing quality, e.g., for each day of the next week, possibly using weather forecasts etc. to populate various inputs to the analysis engine. The user can receive a recommendation to fish a particular day, a ranked list of days in order of predicted best fishing, or a rating for each day. This technique can be extended to times of day, e.g., rating/recommending morning, mid-day, evening, etc. Other time periods can also be recommended, e.g., a user in March could receive a recommendation that the best week to fish for king salmon in north Idaho is typically a certain week in May, etc.

The analysis engine can also provide recommendations about where to fish. As a simple example, often a trout stream can be classified into different sections, e.g., tributaries, headwaters, middle reaches, and lower reaches. Fish may tend to move seasonally among the different sections. Furthermore, the different sections often have different characteristics, e.g., food sources, temperature, oxygenation, siltation, etc. In some implementations, the analysis engine can provide recommendations that distinguish between different locations, e.g., sections of a trout stream. Some implementations may use a technique analogous to that discussed above with respect to terrestrials and nymphs, e.g., separate input nodes may be provided for each of the aforementioned sections. The predicted catch rates for each section can be determined via the analysis engine and users can receive a recommendation that suggests a particular section, shows the relative recommendation strength of the different sections, and/or suggests that the user move upstream or downstream a certain distance to arrive at the recommended location. Other implementations may partition lakes into sections, e.g., north, northeast, east, etc. and make recommendations to fish a particular section of lake. Further implementations may identify fishing streams as freestone, spring fed, or tailwater in the inputs, e.g., by obtaining this information as location characteristics or directly from users.

Note also that some implementations may provide notifications based on users' locations. For example, the third client device may periodically provide its location to the analysis device, and the analysis device can predict fishing conditions in the vicinity of the third client device. If the predicted fishing conditions are particularly good, e.g., predicted number or size of fish is above a particular threshold, predicted rating on a scale of 1-5 is above a threshold, etc., the user may be sent a notification indicating that fishing conditions are likely to be particularly good in their area. For example, a user arriving in St. Maries, Id. in late August might receive a notification like "Try fishing the headwaters of the St. Joe with a terrestrial today or tomorrow, the cutthroat fishing should be fantastic." Some recommendations may also recommend a particular time to fish, e.g., "try fishing Wednesday evening on the headwaters of the St. Joe with a terrestrial."

In some implementations, the user may be notified of particularly good fishing nearby even when they are not currently located at a particular body of water. In further implementations, users can configure the threshold, e.g., request notifications when catch rates are likely to exceed 4 fish per hour, biggest fish is likely to exceed 16", fishing is likely to be 4 or 5 stars, etc., for a species of fish selected by the user. The user can also be provided a notification of particular species they are likely to catch, e.g., "You are near Bear Creek in Dundalk, Md. Right now, you can catch white perch, channel catfish, pumpkinseed, and yellow perch. The white perch fishing rates 4/5 stars, channel catfish and pumpkinseed 3/5, and yellow perch 1/5."

Figure 5A:
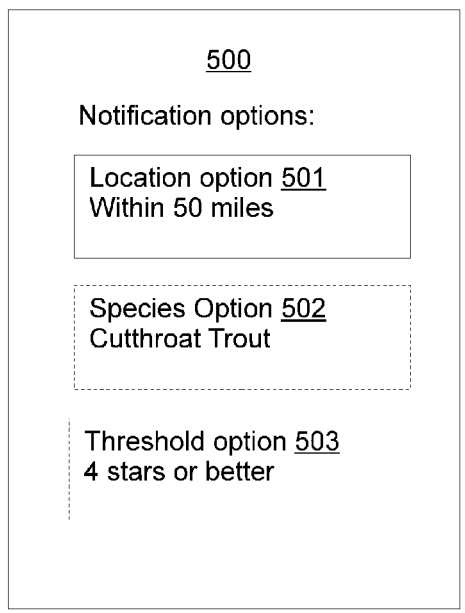

FIG. 5A illustrates a notification registration GUI 500 that can be shown on any of the client devices. GUI 500 can be shown by a fishing application to give a user the ability to configure various options for receiving fishing notifications when fishing is expected to be particularly good at a given locations. Here, the user has configured location option 501 to evaluate locations within 50 miles of the user, configured species option 502 to select cutthroat trout as the species they are interested in, and configured threshold option 503 to select 4 stars or better as the threshold for receiving a push notification about fishing quality. In this configuration, the user will receive a notification displayed on their client device whenever they are within 50 miles of a location that is expected to have cutthroat trout fishing rated 4 stars or better. Note that users can also choose specific locations for location option 501, e.g., the user could register via GUI 500 for a particular location (e.g., a particular lake, a particular river, etc.) instead of a distance from the client device. Note that GUI 500 can be generated locally by the client device (e.g., a local fishing application) or can be received from the analysis device (e.g., a web page generated by the analysis device acting as a web server, or from a different web server).

Figure 5B:
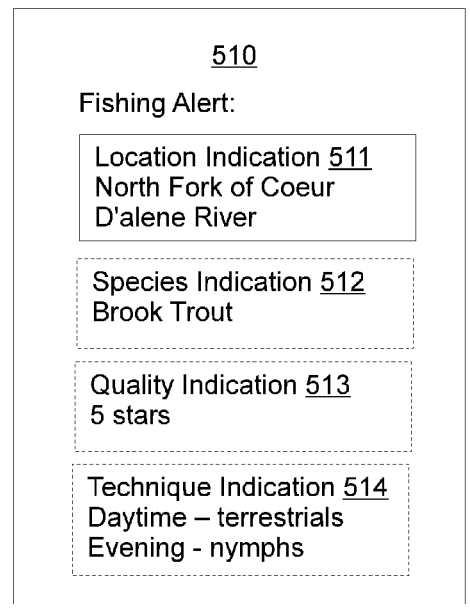

FIG. 5B illustrates a fishing alert GUI 510 that can be shown on any of the client devices that have registered via GUI 500 to receive notifications. Continuing with the example inputs from FIG. 5A, the user has moved within 50 miles of the North Fork of the Coeur D'alene River, and the fishing is expected to be 5 stars for cutthroat trout. Thus, the user is sent the alert GUI 510, which includes a location indication 511, a species indication 512, a quality indication 513, and a technique indication 514. Generally speaking, technique indication 514 can include recommendations received from the analysis device such as those discussed herein. In this case, the technique indication recommends trying terrestrials during the daytime and nymphs at night. Note that these recommendations may be based on previous catch reports from the North Fork of the Coeur D'alene, or from other bodies of water where fish were caught under similar conditions and/or using similar tactics, or as determined by the analysis engine/other rules discussed herein. Note that GUI 510 can also be generated locally by the client device (e.g., a local fishing application) or can be received from the analysis device (e.g., a web page generated by the analysis device). In some cases, the client device sends its location (e.g., periodically) to the analysis device and the analysis device sends an instruction to the client device to display GUI 510 when the user-specified conditions are met. Analysis device can send along indications 511-514 with the instruction so that the client device can populate GUI 510 with these indications.

Other implementations may provide analyses to users automatically irrespective of the user's location. For example, a user can register to receive fishing recommendations and/or a fishing outlook for a particular location. Users may register to receive multiple such recommendations, e.g., one user may register to recommendations and fishing outlooks for the St. Joe, the Coeur D'Alene, the Clark Fork, and the Clearwater rivers. Each day, the user can get an update that compares the fishing at each of the location and provides suggested fishing tactics for each. In some implementations, the various locations can be ranked by the analysis engine and/or some graphical indication of the relative fishing outlook, e.g., a number from 1-10, a graphical gauge or graph, one through 5 stars, etc.

Other recommendations can also suggest how to fish. In some implementations, the analysis engine compares different fishing depths—the depth of the lure, and/or the depth of the body of water at the location where the user is fishing. Thus, the analysis engine may recommend that the user move to a deeper or more shallow section of a body of water, and may also recommend that the user fish at a particular depth.

Also, note that some implementations may use pollution as an input to train the analysis engine. The input may represent parts per million of a given pollutant, perhaps obtained based on periodic sampling by a given agency. Over time, the impact of the pollutant may noticeably impact catch rates for certain species. This, in turn, can be used to both guide users to locations where the fishing experience will be less affected by pollutants, and also to quantify the extent to which particular pollutants hurt the fishing experience. This, in turn, may motivate particular government entities to deal with pollution as a higher priority, e.g., when economic factors related to fish catches are clearly correlated to particular types of pollutants. Also, note that the analysis engine may be trained using pollution as an output. In other words, certain fish catch patterns may tend to indicate pollution in a given area. This approach is discussed more below with respect to indicator species and agency reporting.

Rule-Based Recommendation Filtering

As mentioned above, some implementations may filter recommendations based on certain rules. One example is filtering recommendations to fish with lures or techniques that may be illegal in a particular location. The analysis can check the local fishing rules at the location where the user is located and only recommend lures or techniques that are legal in that location. For example, some fishing streams have different sections, e.g., a catch-and-release section, an artificial lure only section, and a section where bait fishing is allowed. Some implementations may store data identifying fishing regulations for different sections of water at the analysis device and determine which section the requesting user is in to perform the filtering.

Note that fishing regulations for a particular location may be different at different times of year, so the analysis engine may filter differently depending on the date, e.g., if the rules allow bait before June 1 at a location and fly-fishing only thereafter, the recommendation engine may send recommendations to use bait before June 1 and only recommend flies thereafter.

Some implementations may also automatically inform the user of the local laws based on their location. For example, the analysis device could send a message such as "You can only fish catch and release with flies here, but if you move 3 miles downstream you can fish with bait and keep up to 6 trout and 12 bass."

Another example of recommendation filtering is a "reality check" for the outputs of the analysis engine. For example, predefined rules could indicate that lures over a certain size, or of a certain type, should never be recommended for a particular species of fish. This can help prevent instances where the analysis engine outputs may not be sensible. For example, if the analysis engine for some reason recommends fishing for cutthroat with a crankbait that is 8" long, this recommendation can be filtered out based on a predefined rule, e.g., no lures longer than 3" for trout and/or no crankbaits for trout, etc.

Direct Rule Recommendations

Some implementations may also provide recommendations directly based on rules, e.g., without using any machine learning or mathematical techniques to generate the recommendations. Such recommendations can be derived from local tackle shops (e.g., fishing reports that recommend particular lures) periodically, e.g., daily. For example, the analysis device can receive a request for a fishing recommendation at a particular location (e.g., Avery, Id.), correlate the location to the nearest body of water (the St. Joe River), obtain a fishing report for the St. Joe, and send the fishing report to the user. Alternatively, the analysis device may extract information (e.g., recommended lures) from the fishing report and send the extracted information to the requesting client device. In further implementations, the analysis device may extract information from multiple fishing reports for the same location. As mentioned above, hard-coded rules may also be obtained from experts and provided on the analysis or client device. Generally, such rules may specify certain types of lures, retrieval speed, times of day to fish, etc. for particular locations, time of year, and location characteristics, e.g., weather, water conditions, species of fish, etc.

In addition, the analysis device may identify and provide only overlapping recommendations from multiple fishing reports. For example, if a first fishing report for the St. Joe recommends (grasshopper imitations, prince nymphs) and a second fishing report recommends (ant imitations, prince nymphs) the analysis device may only provide the overlapping lure (prince nymph). Alternatively, the analysis device may rank the prince nymph higher than the ant or grasshopper imitation because the prince nymph is mentioned in more fishing reports for the St. Joe, while still identifying all three lures to the client device. Further implementations may count the number of mentions of a given lure type in multiple fishing reports for a given body of water at a given time and rank the lure types based on the number of mentions.

In still further implementations, the analysis device can identify overlapping recommendations from the mathematical/machine learning techniques as well, e.g., if the neural net recommends (ant imitation, prince nymph, wooly bugger) as the top 3 lures, then both ant imitation and prince nymph can be recommended because they are mentioned in two out of the 3 sources (neural net and 2 fishing reports). The other recommendations can be discarded or sent to the user with an indication that they are lower-ranked than the ant imitation and prince nymph.

Other such recommendations can be hard-coded, e.g., a rule that a user fishing the St. Joe in late summer (e.g., July 15-September 15) should be recommended to use a terrestrial. In still further implementations, the user may receive a recommendation to visit a particular tackle shop with a list of recommended fishing items. For example, a rule may say that the user should consider going to a particular tackle shop, provide the name, address, phone number, website, and/or email address of the tackle shop, and identify specific fishing gear appropriate for bodies of water near the user. As a specific example, a user arriving at Avery, Idaho in late summer could get a recommendation to visit a particular tackle shop and get some large grasshopper imitations, some 6× leaders, some floating line, etc to fish the St. Joe. A user arriving at Cass, W. Va. may get a different recommendation, e.g., pick up some ant imitations and some 7× leaders at a tackle shop in Monterville W. Va. to fish the Elk River or the Shaver's Fork.

Note that some of this information (e.g., recommended lures) can be recommended from the analysis engine and other information (e.g., leader size) can be recommended using hard-coded rules. In other words, direct rule recommendations can be combined with rules learned by the analysis engine. For example, the analysis engine can provide the recommended fly patterns and sizes. Hard-coded rules can be used to recommend line/leader weights, e.g., a hard-coded rule can recommend a particular leader size and/or line/tippet weight whenever the analysis engine recommends a size 16 dry fly, and can recommend a thicker leader or line/tippet weight whenever the analysis engine recommends a size 10 dry fly.

Note also that some implementations may use data mining techniques to obtain direct fishing rules. Fishing reports, magazine articles, etc. can be mined for occurrences of names of fishing locations and associated lures. For example, if the words "grasshopper" tend to appear frequently with the words "St. Joe" and "Idaho" in electronic documents, then this may indicate that grasshoppers are an appropriate recommendation for the St. Joe. Other implementations may rely on predetermined formatting of fishing reports and extract information from predetermined fields thereof.

Other Algorithms

As mentioned above, one implementation of the analysis engine is as a neural network. However, other machine learning or analysis techniques are contemplated. Generally speaking, fishing or hunting analysis can be formulated as a pattern recognition problem as introduced above with the neural network, as a classification problem, etc. As another example, single or multiple regression techniques (least squares, polynomial, etc.) can be used to identify particular fishing recommendations (e.g., treating inputs discussed above w/respect to the neural network as independent variables for regression and outputs as dependent variables). Other exemplary machine learning techniques such as Bayesian nets, support vector machines, genetic algorithms, etc. can be used to implement the analysis engine. To some extent, the choice of machine learning or analysis technique may be dependent on the amount and character of the data that is available.

Also note that some implementations may use machine-learning algorithms to apply direct rules for one location to different locations. As an example, suppose the St. Joe River is a well-known cutthroat stream and there are numerous existing fishing reports available from various fly shops, magazines, web sites, etc. explaining how to fish the St. Joe at different times of year. Now, assume there is a relatively less well-known stream, e.g., ABC Creek, that is less well known and has very few, if any, available fishing reports. Some implementations may classify/cluster various fishing locations into groups and provide fishing recommendations for a particular group. Thus, if ABC Creek has location characteristics similar to those of the St. Joe, ABC creek may be clustered/classified with the St. Joe (e.g., using k-means, K-nearest neighbor, etc.). Thus, a user at ABC Creek can be sent a recommendation using a fishing report for the St. Joe. Note that, in this example, the analysis engine can perform the clustering/classification to identify that ABC Creek is a "match" for the St. Joe based on their location characteristics, but the recommendation itself can be taken from a manually-generated fishing report for the St. Joe.

With regard to techniques such as neural nets, regression, etc., these techniques can provide coefficients/weights that give relative strengths of various inputs on the results. For example, consider a regression analysis done on a large sample of fishing reports for a first species where the determined coefficient for lure size (e.g., fly size, weight in ounces of a spinner/crankbait, etc.) is 10× larger than the determined coefficient for lure color. For this species, it seems lure size is far more important than lure color, and fishing recommendations/rules can be developed that emphasize lure size when users are fishing for the first species. On the other hand, a second species may have a somewhat opposite pattern where the coefficients are reversed, and in this case lure color may be emphasized in fishing recommendations more than lure size. Note that some implementations may rank lure characteristics (size, color, type such as spinner vs. crankbait) and highlight or otherwise distinguish relatively higher-ranking characteristics. Thus, a user may be informed that for the first species size is the most important characteristic and color for the second species. This may help the user choose a lure that will work reasonably well even if they do not have any of the lures recommended by the analysis engine at a particular time/location.

Client Application

As mentioned above, client devices can perform several broad roles. First, client devices can provide fishing data that can be used to train the analysis engine via catch reports. Second, client devices can receive fishing analyses, query the analysis engine, etc. Thirdly, as mentioned above, the client devices can perform any or all of the functionality mentioned above with respect to the analysis device instead of using a client-server model. Note also that references to sending, receiving, etc. with respect to the analysis device above can be interpreted as references to communicating data with a local analysis engine when analysis functionality is performed by the client device. Also note that any functionality described herein as associated with the client device can be associated with fishing and/or hunting application that can control a camera of the client device to obtain images for submitted reports.

In some cases, client devices can perform multiple roles, e.g., a client device can report fish catches in some instances and can request or receive recommendations in different instances. As also mentioned above, the client application can obtain any of the data mentioned above with respect to the analysis device and perform local analysis (e.g., providing recommendations, etc.) with a local analysis engine, based on locally-stored rules, etc.

One way for users to report catches is with a picture. In some implementations, a client-side application is provided that automatically time and location stamps pictures with the time & location where the pictures are taken. This data can be provided to the analysis device as separate data, e.g., apart from the picture, can be included in a filename of the picture, can be embedded as a watermark in the picture, as picture metadata (e.g., exchangable image file format). Watermarking pictures in this fashion can be one way to help ensure users report their catches honestly. Other implementations may use encrypted pictures or fishing data to ensure security, digital signatures, etc. Note also that many fishing/hunting locations may be out of cellular range. In such implementations, the GPS on the client device may be used to determine the location where fishing/hunting data is obtained, and the fishing/hunting data (including any picture) may be timestamped as well. Once the client device reaches a location with cellular or wireless connectivity, the fishing/hunting data can be uploaded to the analysis device.

Generally it may be desirable to make reporting a catch as easy as possible for a user, to encourage users to provide fishing data. Some implementations may guide a user through a series of steps to provide a catch report, where they identify the species of fish, size of the fish, type of lure, etc. via freeform text, dropdown menus, radio buttons, or other graphical interface elements. In further implementations, the user is presented with an interface that is auto-generated based on the user's location with options that are particular to the user's location.

For example, as shown in FIG. 6A, a user on the St. Joe could be provided a reporting menu 520 with a species option 521, a size option 522, and a lure option 523. Based on the user's location (the St. Joe being a trout stream), the species option can be populated with species such as (Cutthroat, Brook trout). The size option can be populated with appropriate sizes for the species of fish selected by the user, e.g., (8-10", 10-12", 12-14", 14-16"), and the lure option can be populated with commonly-used lures for the location and/or species of fish being reported (spinner, terrestrial, nymph), and the user can select from the different various options to identify the species, size, and lure used. Note that some implementations may populate the size option and/or lure option after the user selects a species to report, and thus the size and lure options can be based on the reported species.

As shown in FIG. 6B, a different user at Loch Raven (a bass lake) in Baltimore could be provided with different species options (Largemouth Bass, Pumpkinseed, Crappie), different lure options, (crankbait, plastic worm, spinnerbait) and different size options (8-12", 12-16", 16-20", 20-24"). Since Pumpkinseed and Crappie are generally smaller the size menu may be populated with (6-8", 8-10", 10-12", and 12-14") if the user selects these species. Likewise, if earthworms are more frequently used for crappie/pumpkinseed fishing than crankbaits, the crankbait option may be replaced with an earthworm option for lure options 523. Note that GUI 520 can be generated locally by the client device (e.g., a local fishing application) or can be received from the analysis device (e.g., a web page generated by the analysis device acting as a web server, or from a different web server). For example, the client device can store rules for populating the various menu options, or can send its location to the analysis device which can determine, based on the location, which species (and perhaps size/lures) to populate in GUI 520.

In other implementations, a reporting application on the client device can automatically begin voice recording whenever a user takes a picture, and the user can simply speak the fish species, size, and/or lure or other fishing data. Speech recognition can be performed on the client device or the analysis device to convert the spoken fishing data into a representation suitable for processing by the analysis engine.

Note that the aforementioned menus can be generated based on rules indicating particular fish species that are likely to be caught at a particular location (e.g., a database of fish known to live in certain lakes, ponds, rivers, or geographic areas). In other implementations, the menus are populated based on received catch reports. For example, for a given lake, the species-identification menu can include a ranked list of fish species reported caught in that lake, ranked based on the number of catches. Thus, if the lake has 100 reported smallmouth bass catches, 50 reported largemouth bass catches, and 30 sunfish catches, the reporting menu can be autopopulated with smallmouth listed first, largemouth second, and sunfish third for users at that lake.

The above reasoning can also be extended to size options and lure options. In other words, the size option for a given species can include sizes that are based on previously-reported catches for a given species, e.g., a first option for the 0-20 percentile size for a given species, a second option for the 21-40 percentile size, and so on. Likewise, the lure option can include a fixed number of lure options representing the most commonly reported lures to catch a given species. Further implementations may adjust the options depending on location, e.g., the bass size menu in Florida may include options for larger fish in Connecticut either based on a predefined rule or simply because users from Florida report larger bass catches.

This is also true for lure options, a predefined rule can state that crankbaits are in the largemouth bass lure options for Connecticut but not Florida. Alternatively, the lure options could be populated based on catch reports and it may be that the crankbait option does not appear in the Florida options because relatively few users in Florida report catches with crankbaits. For example, the lure options in the reporting menu could include a ranked list of lures. The list can be ranked based on the relative frequency with which each lure type has been used to report catches for a user-selected species, the relative frequency with which each lure type has been used to report catches for a given location (e.g., of the client device), or based on the relative frequency with which each lure type has been used to report catches of the user-selected species at the location. For example, if 100 catch reports for largemouth bass have been received for ABC lake, 50 taken with crankbaits, 30 with spinnerbaits, and 20 with plastic worms, the menu can be populated with crankbaits, spinnerbaits, and plastic worms in ranked order when a user at ABC lake selects reporting of a largemouth bass.

Note also that further implementations may provide a scrolling list of different lure and/or size options with relatively comprehensive choices that are ranked based on pre-defined rules and/or catch reports. In the previous example, if crankbaits are not frequently used in Florida for largemouth bass fishing, they may be simply positioned lower in a scrolling menu for reporting the lure option than they may be in Connecticut. Thus, as a given lure becomes more popular, the lure may tend to move up on the lure option menus.

Also note that menus can be seasonal, based on either rules or catches. For example, a rule may be defined to populate the species reporting menu for a river in Alaska with a first species of salmon during the first two weeks of June, a second species of salmon for the last two weeks of June, and so on. Further implementations may vary the menus for different locations on the stream, e.g., to account for movement of particular fish species upstream during migrations. Also note that menus can be autopopulated as mentioned above by applying a cutoff date to catch reports, e.g., the species in the menu can be ranked based on the number of catches in the past week or even using a decay function that discounts older catches relative to newer catches.

Some implementations may also share the pictures and catch reports among various users. This can help facilitate truthful reporting, because user feedback can be used to determine whether a particular catch report and/or user is truthful. Note that statistical techniques, e.g., for detecting outliers, can also be applied to automatically identify catch reports that are likely false and/or repeat offenders of false catch reports.

In still further implementations, users may get a report of fish caught at their particular location, e.g., "Over the last 7 days, 6 cutthroat have been reported caught within 100 yards of your current location. The largest fish was 14", the average was 10. Here are pictures of the fish. Three were caught on grasshopper imitations, one on an ant, one on a prince nymph, and one on an elk hair caddis." In other implementations, users can request such a report in advance, e.g., the user may click a particular location on a map and receive a report of fish caught at that location as mentioned above. Users can also specifically request only reports of particular species of fish, fish over a particular size, fish caught with flies or other types of lures, etc. In such implementations, the report identifies fish that were caught according to the user's specified constraints.

Generally speaking, the various recommendations, reports, etc., mentioned above can be provided to users by sending one or more messages to the user's client device. For example, a recommendation could be displayed on the client device as a simple text message identifying a particular recommended lure. Other representations of analyses can be provided graphically, e.g., visual indicators of the relative strength of each lure. In the example mentioned above where the predicted catch rates were (3.0, 2.1, 1.4) for (terrestrial, nymph, emerger), a graphical interface can be presented on the client device with individual bars of proportional length to the predicted catch rates, e.g., a first bar of length 3.0 for the terrestrial, a second bar of length 2.1 for the nymph, and a third bar of length 1.4 for the emerger.

As also mentioned above, some implementations may allow the users to query the analysis engine for relative strengths of particular lures. For example, the user could identify terrestrials, emergers, and nymphs as lures of interest in a query sent from the client device to the analysis device, and the analysis device can respond as mentioned above. As also mentioned, the analysis device can do so without receiving a query identifying the particular lures of interest. Rather, for example, the analysis can send the top-n (e.g., top 3) lures ranked by recommendation strength to the user without receiving an explicit request. Similarly, the user can query the analysis engine for relative strengths of different fishing locations or times identified by the queries, and the analysis engine can return rated and/or ranked lists of the locations and/or times identified by the user. For example, the user may be able to fish either Tuesday night or Thursday morning, and can request an analysis of both of these times, e.g., rating/ranking the user's selected times by how good the fishing is predicted to be. In some implementations, the rated/ranked lists of locations, times, or lures can be provided for a particular fish and/or size of fish, e.g. the user's query can specify "large cutthroat" or "cutthroat over 14" or "brook trout" and the recommended locations, times, and lures can be specific to the identified species/size.

Fishing Rod/Reel Data

In some implementations, the fishing data can include data obtained from one or more sensors on a user's fishing rod. For example, optical, magnetic, or other triggering techniques can be used to measure the speed with which a user retrieves a lure (e.g., possibly taking into account mechanical characteristics of the reel, e.g., diameter, gear ratio, etc.) by mounting an optical, magnetic, or other sensor on the fishing rod. In some implementations, the retrieval speed is transmitted to the client device (e.g., by programmable processor, ASIC, FPGA, etc.) via wireless, which in turn reports the retrieval speed with the fishing data. The retrieval speed can be recorded over time, e.g., the last 10 seconds before a fish is caught, etc. The retrieval speed can be used to train the analysis engine, e.g., to learn what retrieval speeds are effective for catching fish. Note that since the analysis engine inputs also can include water temperature, the analysis engine may learn, for example, that relatively faster retrieval speeds are effective at warmer temperatures and slower retrieval speeds are more effective at colder temperatures. Moreover, the analysis engine may learn particular speeds that are best suited for catching particular species at particular temperatures, e.g., with particular lures.

In such implementations, the recommendations received by a user can include a retrieval speed. For example, the retrieval speed recommendation can say "fast retrieve" or "slow retrieve," or give a measurement in feet per second or other metric. When the user's fishing rod includes a triggering sensor as mentioned above, the user's retrieval speed can be measured to see whether the retrieval speed matches the recommendation. For example, the fishing rod can include some logic (programmable processor, FPGA, ASIC, or other logic circuit) that receives the recommended speed from the client device. The fishing rod can also include several indicating LEDs, an LED, LCD, or other display screen, or other type of interface to provide feedback indicating whether the user's retrieval speed matches the recommendation. Thus, for example, the user may see a red light on the fishing rod when the retrieval speed is too fast, a blue light when the retrieval speed is too slow, and a green light when the retrieval speed matches the recommendation (e.g., within some threshold). In other implementations, a display screen may be attached on the rod or reel with a graphical interface such as a dial gauge (like a tachometer) that shows the user's retrieval rate with a needle and includes a "green' range with recommended speed, a blue range for slower than the recommended speed, and a red range for faster than the recommended speed. Note in other implementations the logic on the fishing rod can send the retrieval speed or sensor outputs back to the client device, which can either include an interface thereon indicating whether the retrieval speed is correct or can control (e.g. wirelessly) an interface on the fishing rod to indicate whether the retrieval speed is correct.

Further implementations can use techniques similar to those mentioned above to measure "action" imparted to the lure. For example, one or more accelerometers can be used to measure jigging action (e.g., frequency of jigging, amplitude). As mentioned above for the retrieval speed, the analysis device may use the frequency/amplitude of jigging to train the analysis engine, and may provide recommended jigging frequencies/amplitudes. Fishing rods/reels and/or client devices can include interfaces that provide feedback to users indicating whether the user's fishing technique matches the recommendation, e.g., using one or more accelerometers on the fishing rod.

Note also that retrieval speed and/or jigging amplitude/frequency recommendations can be provided based on predefined rules instead of "learned." For example, a rule could indicate that a person fishing for bass in waters between 70 and 78 degrees Fahrenheit should try a relatively fast retrieval speed, for waters between 65-70 a moderate speed, and under 65 a slow retrieval speed. Again, the user can be provided with feedback indicating whether the retrieval speed is correct. Note that different temperature ranges and retrieval speeds may be appropriate for different species, in different locations, in different seasons, etc. Thus, rules may vary based on any of these factors.

Also note that some implementations may include a GPS or other location device along with a visual interface (e.g., display or LEDs) mounted on a rod and/or reel. The rod and/or reel can include a logic circuit as mentioned above that controls the display or LEDs. The rod and/or reel can include rules that match a locally-generated date/time or remotely-obtained date/time and location to a locally-stored or remotely-obtained fishing speed. For example, the logic circuit can have logic that says between March 1 and May 1 between 40 and 45 degrees north latitude, retrieve at a certain speed, and at a faster speed between May 1 and June 1, and so on. The logic circuit can also present user-selectable options to select species and/or lure types via the interface (e.g., via one or more buttons). For example, the retrieval speeds may be faster for crankbaits than for spinnerbaits, etc., or faster for smallmouth bass than for largemouth bass. In such implementations, the logic circuit may have all of the information needed without connectivity to provide a rule-based recommendation for retrieval speed via the LED or display. Moreover, user selections may allow the user to configure the logic so as to provide speeds that are specified for particular lure types, species of fish, water depth, water temp, etc. Note also that the rules in the logic circuit may be derived, for example, by querying an analysis engine, by hard-coding, etc.

Hunting Example

The disclosed implementations can also be used in a hunting context, or by other users who wish to see animals in their natural habitat. For example, method 200 can be performed as mentioned above using hunting data instead of fishing data. In some implementations, hunting data is provided by a client application such as the fishing client application mentioned above, e.g., users can submit animal reports when they identify animals in the wild. These reports can identify when and where the animals were identified, e.g., with or without pictures as mentioned above. A client application can provide analyses to a user that are obtained from an analysis engine trained using the reports. Also note that direct rules can also be applied in a hunting context.

In other implementations, the animal reports are obtained from one or more "game cameras" or "trail cameras" left out in nature by the users. An exemplary trail camera is disclosed in U.S. Patent Publication No. 2002/0159770 to Moultrie, J R. The trail cameras can take pictures of various animals when motion triggers the camera to do so. The pictures can be watermarked with the date/time/location/elevation as mentioned above, encrypted along with the date/time/location/elevation, or provided in an unprotected format. In some implementations, users may manually go through the trail pictures to identify animals therein, although, to the extent automatic animal (or fish) recognition technologies provide sufficiently accurate recognition, such auto-recognition techniques can also be used to identify animals (or fish) in hunting (or fishing) reports.

One example of an analysis device for hunting purposes could be a neural net similar to method 400. For example, input nodes reflecting (1) elevation, (2) distance from nearest road, and (3) time of year could provide useful information to the neural network. In some implementations, the neural network may use for the output node a number of different animals that appear on a trail camera for the output node, or a number of animals (possibly specifying species, sex, etc.) seen by a user over a given time period (e.g., 8 elk in 4 hours=2 elk per hour), or a qualitative rating provided by a user (1-5 stars, 5 stars being many animals, 1 star being 0 or very few). The hunting data output can also be obtained from hunter reports submitted to state agencies, e.g., tagged kills.

By training the neural network with user-submitted reports of animals identified in person or on trail cameras installed at various elevations and/or distances from roads/times of year, the neural network may learn how certain animals (e.g., elk) act over the course of a certain time frame (e.g., hunting season). For example, if elk in areas close to roads tend to stay at high elevations whereas elk further from roads tend to move to low elevations in early fall, this can provide useful information to hunters or other outdoors enthusiasts that wish to see elk at certain times of year.

For example, once the analysis engine is trained, consider a hunter walking in the woods with a mobile device having a hunting application that is in communication with the analysis device. The user may be hunting at a relatively low elevation, e.g., 2500 ft, in an area with mountains ranging up to 6500 feet within a relatively short distance, e.g., 50 miles. The user's device may report the user's location at 2500 feet as well as the distance to the nearest road. Next, the analysis device may determine a predicted number of trail camera and/or user sightings for the user's current location, and may also try various other inputs that are reasonable for the user's area, e.g., elevations under 6500 feet. The user may be provided a recommendation, e.g., "try hunting between 5000-5500 feet elevation" based on the outputs of the analysis engine because the predicted number of sightings is higher in this range than other ranges. In some implementations, elevation "brackets" can be ranked, e.g., every 500 feet can be ranked on a scale from 1-5. Then, a user can be provided with a map showing the different rankings of the elevations in different colors, e.g., darker colors for elevation brackets with higher rankings. This can give the user the opportunity to see the "lay of the land" as well as what roads or trails might be available to access the most highly recommended elevations. Users may also be able to query for locations that meet certain criteria, e.g., show me all locations between 5000-6000 feet with dense vegetation, canopy closure, etc. and receive a map identifying such locations in a different color (or darkness level in grayscale implementations) than other locations.

Similar techniques can also be used to suggest locations where a user should install trail cameras. For example, a trail camera may suggest to a user to move up a certain number of feet in elevation (e.g., two brackets), move west to a draw, move north to a saddle, etc. Thus, the trail camera can evaluate its own location. In further implementations, a trail camera or hunting application on a mobile device can have menu option to select a particular species so the recommended elevation/location is for the particular species.

Note also that different analysis engines can be trained for different locations, e.g., a first neural net could be trained for one region (e.g., Idaho panhandle) and another neural net could be trained for a different location (e.g., southern Idaho). In other implementations, differences between locations can be quantified (latitude, longitude, max elevation, average elevation, min elevation, etc.) and used as inputs to the analysis engine.

Also note that the functionality mentioned above can also be provided using hard-coded rules instead of from a data-trained analysis engine. For example, a trail camera or client application for a hunter could have a recommendation to place the trail camera or to hunt at a particular elevation at particular times of year, e.g., in particular regions for particular species. In some instances, these rules can be obtained from experts such as local hunting guides. Direct rules can also direct a user to move toward feeding grounds (e.g., low-lying fields) in the evening or move uphill in mid-morning to catch deer moving with rising thermals, move toward the denser-vegetated north face of a mountain to pursue pressured elk during hunting season, etc. In implementations with mapping functionality, the user can also be provided with a GPS mapping interface to guide the user to suggested hunting locations, e.g., locations where imagery indicates vegetative cover is consistent with a feeding ground, move halfway up to the nearest ridge at mid-morning, move to the north face of a mountain, etc. The mapping interface may also route the user in a direction that generally has them moving into the wind so as to avoid being scented by game.

Similar recommendations can also be used to direct placement of trail cameras, e.g., via an interface on a client device or an interface provided directly on the trail camera. In some implementations, trail cameras can also be provided with a processor and logic that performs analysis engine functionality as mentioned above. In other implementations, trail cameras can have a wired or wireless interface to download a set of direct rules and/or model parameters from a client device or server (e.g., analysis device). Trail cameras can also have locally-stored location characteristics to direct users to locations as mentioned above or to rate particular locations based on how well suited the locations are for placement of the trail cameras. Likewise, a trail camera can include one or more LED/LCD screens or other display interfaces to provide such feedback to the user.

Cellular Connectivity

Some individuals may tend to hunt or fish in locations where there is no cell phone coverage. In such implementations, users may specify the location they are going and receive a fishing or hunting analysis before they move to the location, e.g., while they have cell connectivity. As mentioned above, other implementations may use an analysis engine that is local to the client device. Note that some implementations may also periodically provide analysis engine parameters to the client device (e.g., neural network weights, regression model parameters). Thus, the analysis engine can be trained at a remote analysis engine and the parameters provided to a local analysis engine on the client device. Such implementations may provide a local database of location characteristics on the client device. For example, a user may enter the location they are going into the client device and the client application can download location characteristics for the surrounding area, e.g., by accessing one or more servers as mentioned above while the user has connectivity. Other implementations may permanently store location characteristics on the client device, e.g., a limited subset. Note that some implementations may work cooperatively with a local GPS map application (e.g., a topographic map application) to obtain location characteristics. Note also that some such GPS applications may include image data, e.g., which can be used to provide vegetative cover inputs to the analysis engine.

Also note that trail cameras can be provided with logic (e.g., a processor and memory, ASIC, FPGA, etc). that can perform the functionality mentioned above for the analysis device when there is no connectivity. For example, a trail camera can also train a local analysis engine, populate a local analysis engine with parameters from a remotely-trained analysis engine, or use stored rules to provide an analysis to a user of the trail camera. For example, the trail camera could include an LED, LCD, etc. display device that suggests the user move the camera to different elevations or locations as mentioned previously.

Data Reporting

In further implementations, the analysis device 150 can communicate with agency device 160 and/or sporting goods entity device 170. For example, analysis device 150 can send reports (such as fish catch reports, animal sightings/kills, etc.) to sporting goods stores in the area where the reports were made. Thus, a tackle shop in a given location can use images of locally-caught fish on a webpage, etc. Some implementations may rank fishing guides based on numbers of fish caught, catch rates, trophy fish, etc. Ranked lists of local fishing guides can then be sent to users of client devices, e.g., guides within a threshold distance of a current location of a client device or a location selected by a user of the client device.

In further implementations, users may be prompted to request whether they would like to share some or all of the data for a given catch report with a local tackle shop, possibly selected based on distance from the client device. If so, the user may be given the option of sharing only a picture of the catch or other information species identification, a picture, species identification, size of the fish, lure used, etc. In further implementations, the user can configure the client device with which of these data fields to share ahead of time and then any time the user takes a picture of a fish via the fishing application on the client device that picture can automatically be sent to a local tackle shop. In still further implementations, the user can be asked whether they used a lure recommended by a local tackle shop (e.g., either in a published fishing report or directly from a tackle shop salesperson). Tackle shops can then be ranked based on catch rates, numbers of fish caught, etc. for lures they recommended in a manner similar to that set forth above with respect to fishing guides.

Analysis device 150 can also send reports to agency device 160, e.g., the agency device can be a local or national government entity with some interest in obtaining data from the analysis device. For example, NOAA may be interested in catch reports of certain fish types in the ocean (e.g., shortfin Mako sharks), whereas Idaho Fish and Game may be interested in fish caught in freshwater (e.g., king salmon or Dolly Varden). As discussed more below, agencies may also be interested in information such as what lure types were used to catch the fish, fishing conditions (weather, time of day, water temp, time of year, etc.).

In some implementations, users may agree to provide certain information about their hunting/fishing experience to a particular agency but may not wish to share this information with the public at large. For example, a user may not wish to share their favorite hunting and/or fishing location with other individuals, but may be willing to share this information with an agency such as NOAA or a state Department of Natural Resources. In such implementations, the client device can encrypt "sensitive" parts of catch reports such as the location, time, etc., using a public key of the agency. The agency can then decrypt this information upon receiving the catch report from the client device. In some implementations, the client device can be configured to send catch reports directly to the agency server 160, and in other implementations the encrypting and/or forwarding to the agency server is performed by the analysis device 150.

In some implementations, the agency may set "triggers" defining the particular data that they are interested in. For example, Idaho Fish and Game may define triggers so that they receive only reports for King Salmon catches on the Clearwater River during a particular month of the year. In this case, the client application and/or analysis device can be configured to compare catch reports to criteria specified by the agency and forward only matching catch reports to the agency.

In further implementations, the agency may be interested in understanding how different lure types impact fish populations. For example, a given lure type may tend to catch an endangered species or other species of interest at a particularly high rate. The agency might like to know about this so that they can consider outlawing using that lure type in areas where the endangered species/species of interest are found. To facilitate this analysis, the analysis device can be configured to determine a number of catches of species of interest on various lure types, and also a number of catches of other fish on these lure types. For example, consider data obtained over the course of a year on a given river, where 300 catch reports were submitted using spinners as lures on the river and 400 catch reports were submitted using dry flies. Now, assume 100 out of the 300 spinner catch reports were of Dolly Varden, and only 15 of the 400 catch reports using flies were of Dolly Varden. Here, the agency may wish to outlaw or limit the use of spinners in this particular river or in areas that Dolly Varden are known to live. In some implementations, the agency device 160 may send criteria (e.g., a "trigger") for when the analysis device should report a given lure type, e.g., when the lure catches an endangered species over a given percentage of the time, more than a certain number of times per year (perhaps limited to a specific location), etc.

In some implementations, the analysis device can be configured to provide filtered catch reports to the agency device for species of interest. In other words, the agency does not receive all catch reports, but only those for a given species of interest. In further implementations, the analysis device may rank different lure types by how likely the lure is to catch species of interest relative to other lures and provide this information to the agency.

Similar processing can be performed for fish mortality. In some implementations, users may report whether released fish swam away vigorously, were obviously injured or dead, etc. The analysis device may correlate numbers of injured and/or dead fish to particular lure types. If a given lure type tends to produce relatively high mortality and/or injury rates, the agency may wish to further regulate that lure type.

In further implementations, an agency may want to know when a particular species is found in a given area. For example, the Maryland Department of Natural Resources may be interested in catches of snakehead fish in the Potomac River. In particular, this agency may be particularly interested if such fish are caught upstream of a given landmark, e.g., a bridge that demarcates two stretches of the river. In this example, the client device and/or analysis device can be configured to send reports to the MD DNR when snakehead are caught upstream of the bridge, but not downstream of the bridge on the same river.

Note also that agencies may be interested in other information besides just the type of fish caught. For example, agencies may be interested in when fish were caught under certain conditions. If a given species of fish is not generally found in waters with salinity above a certain threshold, the agency can set a trigger so that they only receive catch reports when that species is caught in areas where the salinity is above the threshold. This can help uncover instances when either scientific understanding about the behavior of the fish is incorrect, or perhaps that a given species is adapting to new habitats and/or being forced out of preferred habitats because of some other factor, such as pollution.

Indeed, in some cases, the information useful to the agency may have nothing to do with the fish being caught at all. For example, NOAA may be interested in any salinity values for a given area, and it may be that commercial and/or recreational fishermen are a good source of data for the agency. For example, boats may carry salinity probes that measure salinity, and users can either manually enter salinity values into the client device when reporting a fish catch or the probes can be configured to communicate salinity values to the client device (e.g., enclosed waterproof USB port, Bluetooth, etc). In this case, the client device and/or analysis device can be configured to provide the salinity data to the agency while stripping out the rest of the catch reports.

Also, note that some fish may be tagged by biologists with identifying tags. In some cases, the tags may have visual identifying indicia (e.g., a serial number) or can use other techniques such as active/passive RF and/or barcodes (including QR codes) of other tag identifying indicia. In such implementations, client devices can be configured to read the identifying indicia (e.g., by RF scan, optical character recognition of serial numbers, or a bar code reader) and auto-populate the catch reports based on the tag. For example, the client device and/or analysis device may access a database or web service that provides species and/or other information based on the tag. Further implementations may use databases and/or web services to determine whether and/or which agency should receive the catch report. For example, one tag identifying a salmon caught in the Pacific Ocean may belong to Alaska Fish and Game and the catch report can automatically be submitted to this agency. Another tag identifying a tuna caught in the Pacific Ocean can belong to NOAA and the catch report can automatically be sent to NOAA. Thus, fish caught in the same location can be reported to different agencies depending on which agencies own the tags and/or registered to receive catch reports for those tags. This can facilitate inter-agency communication, e.g., Alaska Fish and Game may share their tag identifying indicia with NOAA so that NOAA, in this instance, could also register to receive catch reports for the salmon.

In further implementations, push-based requests can be provided to the client device to query the user for information of use to a given agency. For example, if a user enters a designated area (e.g., a state/municipal boundary, game unit, crosses a given latitude, etc.), the user can be sent a push-based notification requesting that the user share certain information with a given agency. The user may be requested to provide information, such as "Have you observed any ospreys in your location" or "How many other boats did you see that appeared to be fishing?" In further implementations, agencies can provide configuration data identifying what, if any, queries should be sent to users in different locations. For example, an agency can request that the analysis device query users to report osprey sightings on one lake and to report numbers of other fishing boats on a different lake. Because the queries are presented to the user in the context of a fishing application, the user may be likely to respond. In other words, if the user is actively using the fishing application to take pictures of fish, report catches, check which lures are likely to be useful, etc., the user may be more likely to respond to such queries.

Note that while the osprey/fishing boat examples presented above require the user to input answers to the client devices, agencies can also query for information on a passive basis. In other words, the agency can request information that is available to the client device without further user inputs, e.g., location, time, weather information, etc. Other information may also be shared, e.g., a user profile having demographic information, age, sex, state of residence, citizenship, etc. This information may already be stored on the client device and/or analysis device and thus the user may not need to actually do anything other than approve providing the information to the agency. Note also that the user may agree ahead of time to share particular information with agencies whenever they request the information, in which case the client device can send the information without even prompting the user.

Agencies may also be interested in data trends over time. For example, some species of fish may be considered "indicator species" in the sense that these species are particularly sensitive to pollution. Other species may be less sensitive to pollution. For example, assume a brook trout is an indicator species of pollution, and a creek chub is less sensitive to pollution. If, over time, fewer and fewer brook trout catches from a given location are reported, this can be an indication of pollution in that area. Similarly, an increase in the ratio of creek chub to brook trout catches can also be an indication of pollution. In some implementations, agencies can use the agency device to register with the analysis device to receive updates when a moving average of brook trout catches falls under a threshold value, and/or a moving average of the ratio of brook trout catches to creek chub catches falls under a threshold value.

Optical Recognition

In some of the aforementioned examples, users selected the particular species of fish that they had caught for each catch report. In some implementations, optical recognition technologies can be used to facilitate identifying a particular species of fish with a catch report. This can relieve the burden on the user to choose the particular species of fish that they have caught. Instead, catch reports can be autopopulated with a corresponding species using the techniques discussed below. In further implementations, catch reports where users have selected the species they have caught can be used as labeled training data to train an optical recognition algorithm to perform species recognition.

Existing efforts at optical recognition of fish species/types have focused on using various image features extracted from images of fish (See, e.g., Alsmadi et al., "Fish Classification Based on Robust Features Extraction From Color Signature Using Back-Propagation Classifier, Journal of Computer Science 7 (1):52-58, 2011, ISSN 1549-3636, 2011, incorporated herein by reference in its entirety). The disclosed implementations may leverage additional information to increase accuracy of fish species recognition. For example, location information about the location where a fish is caught can be used to facilitate classifying an image of the fish. Location information can include data such as the relative catch report frequency of different species of fish at the location, water conditions at the location, weather conditions at the location, predefined classifications of the location (e.g., trout stream vs. bass stream), etc.

A first technique uses location information directly as additional features in an optical recognition algorithm, as discussed more below. In a second technique discussed thereafter, one or more optical recognition algorithms can be applied to an image and location information can be used probabilistically or in a voting scheme to determine a particular species for an image in conjunction with recognition outputs by the one or more optical recognition algorithms.

First Example Technique

FIG. 7 shows an exemplary architecture 700 suitable for use with the first technique. Architecture 700 can be implemented by the analysis engine to determine a species of a fish from an image taken by a user. The determined species can be used to autopopulate a catch report instead of requesting that the user select the species via a menu or other input. Architecture 700 is shown with exemplary image features 701 and 702 as well as catch rate features 703 and 704, each of which can be input to a classifier module 705 that provides a species recognition output 706. For example, classifier module 705 can be a neural network classifier, support vector machine, or other classifier, and image features 701 and 702 can be features that can be obtained from an image, e.g., color, shape, texture features, etc., as discussed in Alsmadi or generally used in the art of image classification. Note that some implementations may use additional image features as inputs to the classifier module, and two such features are shown for simplicity of discussion.

Catch rate features 703 and 704 are examples of location information inputs, and can represent catch rates for a given species of fish. For example, consider an image taken by a user of a cutthroat trout. The analysis engine can determine a location where the fish was caught, e.g., from image metadata indicating where the picture was taken, from a user input identifying the location, etc. For this example, assume the location is determined to be the headwaters of the St. Joe river. The analysis engine may determine that 95% of the catch reports from this section of the St. Joe (e.g., catch reports where users selected cutthroat as the species) are for cutthroat trout, and 5% of the catch reports are for rainbow trout (e.g., catch reports where users selected brook trout as the species). The first catch rate input 703 can be the catch rate for cutthroat trout in the headwaters of the St. Joe (95%), and the second catch rate 704 can be the catch rate for rainbow trout in the headwaters of the St. Joe (5%).

Note that rainbow trout and cutthroat trout are selected for the purposes of this example because they look somewhat similar, not because the aforementioned examples accurately reflect the likelihood of catching these fish species in the St. Joe. Because these two species tend to look very similar, it may be somewhat difficult for a classification algorithm to discriminate between images of these two species based on image features alone. By providing the catch rates of these fish as further features to the classifier module, the classifier module can have additional information that helps the classifier correctly classify the image as a cutthroat trout.

Note that catch rates are but one example of location information that can be used to help classify images of fish. As another example, a simple Boolean feature can be used as a location information input to the classifier module, e.g., the St. Joe can be regarded as a cutthroat stream but not a rainbow trout stream, so the Boolean feature can have a value of 1 for cutthroat and 0 for rainbow trout when classifying images of fish caught on the St. Joe. As another example, the water temperature on the St. Joe at the time the fish was caught could be used as a location information input to the classifier module. For example, if different species tend to be active at very different water temperatures, the water temperature may be useful for classifying fish species. Note also that the various data mentioned previously as location characteristics can also serve as location information, e.g., section of a lake, as a freestone/tailwater/spring fed stream, salinity/temp/weather when a fish is caught, etc.

Note also that, in addition to location information inputs, time information inputs can also be used. For example, an input representing the time of day as morning, afternoon, or evening can be used in addition to or to replace inputs 703 and/or 704. Additionally and/or alternatively, a time input can be used that represents the season or month when the fish was caught. Generally, the idea is that certain fish species may be more predisposed to being caught at particular times of day or of the year, and using a time input can help various classification techniques more accurately recognize a given image of a fish if the time when the fish was caught is known.

FIG. 8 illustrates classifier 705 embodied as a neural network 800. Here, the input nodes of the neural network 801, 802, 803, and 804 correspond to the inputs 701, 702, 703, and 704 shown in architecture 700. The output nodes 810 and 811 collectively represent species output 706 of architecture 700, e.g., whichever of nodes 810 or 811 is set to 1 for a given set of inputs is used as the species output 706. In this example, let species 1 node 810 represent cutthroat trout and species node 811 represent rainbow trout. Hidden nodes 805, 806, 807, 808, and 809 are analogous to hidden nodes 405-409 discussed previously.

Training of network 800 can be performed using previously-submitted catch reports having associated locations and species. For example, each training image where a user selected a cutthroat trout can have species node 810 set to one for that training example, and image features obtained from the training image to populate nodes 801 and 802. Catch rates for the locations of each species can be obtained for each training image as well to populate catch rates 803 and 804. Each training image can be used to adjust values of network parameters such as weights connecting the various nodes and/or threshold values of various nodes, e.g., in an analogous process that can also be used to train network 400. Generally, the training can adjust the network parameters so as to minimize a cost function over the training data, e.g., minimizing a mean-squared error using a gradient descent technique (e.g., backpropogation training) by adjusting the weights connecting nodes of different layers.

Once network 800 is trained, the analysis engine can query the network for a given input (or "target") image. In the aforementioned example of the cutthroat caught on the headwaters of the St. Joe, the analysis engine obtains optical features 801 and 802 from the input image. Likewise, the analysis engine sets the catch rates (or other location/time information associated with the fish shown in the input image) for cutthroat on the St. Joe headwaters at 803 and for rainbow trout at 804. If the network correctly classifies the image, then output node 810 is activated to indicate that the input image is a cutthroat trout.

Second Example Technique

FIG. 9 shows an exemplary architecture 900 suitable for use with the second technique. Like architecture 700, architecture 900 can be implemented by the analysis engine to determine a species of a fish from an image taken by a user. Architecture 900 is shown with exemplary classifiers 901, 902, 903, and 904, although more or fewer classifiers may be used. For example, the classifier modules can be neural network classifiers (e.g., neural network 800), support vector machines (e.g., soft margin), probabalistic (e.g., Bayesian) classifiers, and/or combinations thereof.

Each classifier can use various features such as those discussed above with respect to neural network 800. Note, however, that different classifiers may use different features. For example, some classifiers may use location information and/or time information in conjunction with image features as input features. Other classifiers may classify an image using only image features.

Each classifier can also output a corresponding one or more recognized candidate species, e.g. classifier 901 outputs recognized candidate species 911, classifier 902 outputs recognized candidate species 912, classifier 903 outputs recognized candidate species 913, and classifier 904 outputs recognized candidate species 914. In some implementations, the classifiers output only a single value, e.g., identifying a single recognized candidate species. In other implementations, the classifiers may output an indication of the relative confidence of the classification, e.g., an integer or floating point value. In further implementations, the classifiers can output a ranked list of multiple recognized candidate species, with or without a corresponding indication of the relative confidence of the classification.

Decision module 921 can obtain the recognized candidate species from the respective classifier modules, along with any confidence values. The decision module can evaluate the recognized candidate species to select an individual species as the recognized species for output, shown in FIG. 9 as recognized species output 931. In one implementation, the decision module can simply select the species with the highest corresponding confidence value. In other implementations, the decision module can implement a voting technique where the species selected as the top (or only) recognized candidate species by the most classifier modules is used as the recognized species. In implementations where the classifier modules output ranked lists, a more complex voting scheme can be used, e.g., assigning one point for the third-ranked species, two points for the second-ranked species, and three points for the top-ranked species, and selecting the species having the highest point sum as the recognized species.

Many other plausible implementations exist for the decision module. For example, a function of the confidence values can be defined, e.g., the confidence values of each classifier can be normalized to a floating value between 0 and 1 then summed for each recognized candidate species to select the species with the highest point sum. Further implementations may weight the individual classifiers using coefficients, e.g., classifiers with lower accuracy may be assigned lower coefficients and a weighted sum of output confidence values can be used to select the species. For example, assume classifier module 901 has a coefficient of 0.5 and a normalized confidence of 1 that a given image is a brook trout, classifier module 802 has a coefficient of 0.7 and a normalized confidence of 0.1 that the image is a brook trout, classifier 803 has a coefficient of 0.5 and a normalized confidence of 1 that the image is a cutthroat trout, and classifier 804 has a coefficient of 0.8 and a normalize confidence of 0.1 that the image is a cutthroat trout. Here, the brook trout score is (0.5*1+0.7*0.1)=0.57 and the cutthroat trout score is (0.5*1+0.8*0.1)=0.58. Thus, the recognized species output is cutthroat trout. In some cases, regression or other techniques can be used to learn the various coefficients.

Note also that one goal of the inventive concepts is to facilitate fish species recognition with reasonable accuracy, so as to relieve the burden on the user of a given device from the effort of manually selecting a fish species. In many cases, it is expected and acceptable that misclassification will occur, e.g., due to different lighting conditions, image quality, relative size of the fish in the image, different backgrounds, etc. To the extent that the image recognition works reasonably well, this can encourage users to utilize a fish catch reporting application that they might be reticent to use if they had to always select the fish species manually. In some implementations, the optical recognition algorithms are performed directly on the client device that captures the image, e.g., a smartphone. Training can take place remotely, e.g., on a server using catch reports provided by many different client devices. The trained analysis engine (or at least the optical recognition classifier portion or learned parameters thereof, such as weights and/or thresholds) can then be downloaded to the client device so that the client device can perform image recognition in the field without connectivity to the server. In further implementations, the client device can simply upload the image and location information to the server and the server can perform the recognition processing thereon.

Regardless of where the image classification takes place, the user can be given the opportunity to review the selected species and, if desired, input a different species. For example, a message can be displayed on the client device indicating the auto-recognized species along with a menu option to change the species. If the user selects to change the species, then the catch report can be submitted with the species selected by the user. Otherwise, the catch report can be autopopulated with the autorecognized species and the user does not need to do anything except, in some implementations, confirm that the autorecognized species is correct.

Example Method

Figure 10:
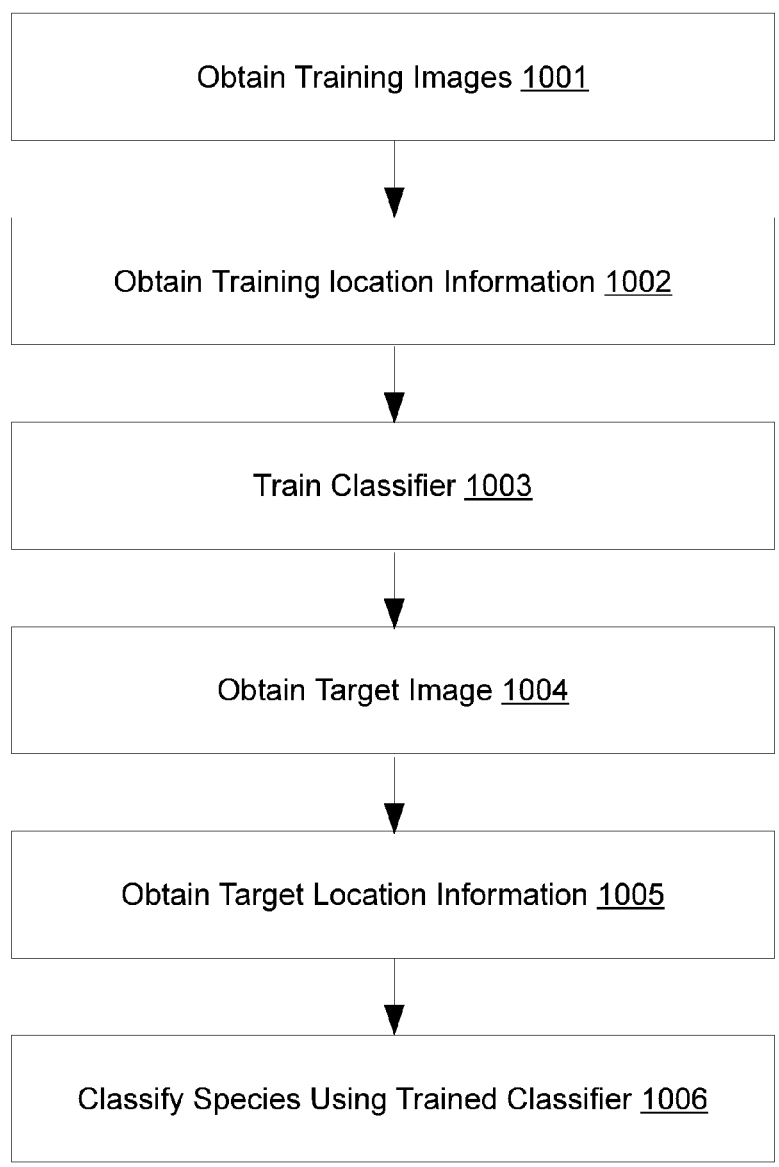

FIG. 10 illustrates an exemplary method 1000 consistent with certain embodiments. Generally speaking, method 1000 can be used to classify images of fish by species using one or more trained classifiers. Method 1000 can be performed using analysis engine 156.

Training images are obtained at block 1001. For example, images of fish caught by users can be obtained from various client devices, along with species of the fish. For example, as noted above, some implementations may allow a user to select a species for a given fish image using a menu or other mechanism. Thus, these images can be used as training data, where the user selection serves as a species label for the image.

Training location information can be obtained at block 1002. For example, for each training image, corresponding location information can be obtained. Generally, the (raining location information can be based on the location where the training image was taken (or based on a user indication of where the fish in the training image was caught). Examples of location information are discussed above, e.g., catch rates for different species at the location, water conditions or weather conditions at the location when the fish was caught, predefined location classifications, etc. Note that training time information can also be obtained at block 1002, e.g., times of day or seasons/months when the fish in the training images were caught, as water/weather conditions at a particular location may change over time.

One or more classifiers can be trained at block 1003. As mentioned, classifiers can include neural networks, support vector machines, etc. Generally, training the classifiers can involve extracting image features from the training images and providing the extracted features to the classifiers. The training can also include providing the training location information to the classifiers, as well as the training labels (species indications). As also mentioned above, in implementations where more than one classifier is used, the different classifiers do not necessarily use the same image features or location information as inputs.

A target image can be obtained at block 1004. For example, a user of a client device may take a picture of a fish (the target image) that they have caught, e.g., using a camera on the client device. A fishing application (or other module) can send the target image to the analysis engine for classification.

Target location information can be obtained at block 1005. For example, the analysis engine may obtain various location information for the target location. The target location information may be analogous to the aforementioned training location information. Time information can be obtained in addition or alternatively to the target location information, such as information about when the fish was caught (time of day, month, season, etc.).

The species of a fish in the target image can be classified at block 1006. For example, target image features can be extracted from the target image and provided as inputs to the one or more classifiers. Likewise, the target location information can be provided as other inputs to the one or more classifiers. In implementations with a single classifier, the species selected by the classifier can be selected as the recognized species. In implementations with multiple classifiers, each classifier can provide one or more recognized candidate species and a decision module can determine a selected recognized species therefrom. Note that some implementations may automatically populate and/or submit a catch report from a client device with the selected recognized species. Other implementations may display the selected recognized species to the user and request user confirmation before populating or submitting the catch report.

Note also that some implementations may display, on the client device, multiple candidate recognized species and allow the user to choose between them. The species selected by the user can then be used to populate and submit a catch report to the analysis device. Further implementations may apply rules to the classifier outputs, e.g., to eliminate certain classifications. For example, if the highest-ranked recognized candidate species is rainbow trout (by either the decision module or a single classifier) and the second highest-ranked species is cutthroat, but the fish was caught in a location without rainbow trout, a defined rule can eliminate the rainbow trout and instead select the second highest-ranked species.

Some implementations may also provide for the client device and/or analysis device to report the species to the agency device. For example, agencies may wish to register to receive reports of certain species caught in certain areas. Furthermore, such agencies may wish to set a confidence threshold before receiving any such reports. As one example, an agency could set a confidence threshold that at least two different optical classifiers identify a fish as a snakehead before the corresponding catch report is sent to the agency.

Note also that the disclosed implementations can also be used to distinguish not only between fish of different species, but of different types of fish of the same species. For example, many western state agencies allow anglers to keep hatchery steelhead, but not native steelhead. Hatchery steelhead often have their adipose fin clipped to distinguish them from native steelhead. Some implementations may train one or more classifiers using two sets of training images—images known to be hatchery fish with clipped adipose fins, and images known to be native fish with intact adipose fins.

Further implementations may suggest to the user that a given species of fish should be returned to the water alive. For example, if a fish is classified as a native steelhead, a message can be displayed to the user indicating they are required by law to return the fish to the water alive. Conversely, if the fish is classified as a hatchery fish, a message may be displayed indicating the user may keep the fish. Further implementations may even fill out or submit an automated catch "tag" to the state fish and wildlife or department of natural resources agency. This electronic report can be sent directly from the client device to the agency or routed through the analysis device, and can take the place of manual reporting of fish catches as is often currently done by a paper tag received when an angler purchases a fishing license.

Note also that obtaining the training location information and/or target location information can include accessing one or more remote servers that provide such information. For example, when training a given classifier using labeled training images, the analysis engine (on a client device or server) can obtain (e.g., historical) weather data, water temperature, salinity, stream flows, etc., for the location/time where the fish in the labeled training images were caught. The analysis engine can also obtain other location information such as elevation, lake sector or stream section, etc. for the training images. When doing the classification of a fish in a target image, analogous location information can be obtained for the target location and time when the fish in the target image was caught.

CONCLUSION

The disclosed implementations are exemplary and are not intended to limit the scope of the claims. However, note that the claims of this application are limited to processing of outdoors-related data and related concepts as described herein. The claims of this application are not intended to have general applicability outside the context of processing/analyzing/using outdoors-related data. For example, the exemplary techniques herein for populating menus with information as fish species should not be construed as a generalized technique for populating of menus on graphical interfaces with data that is not related to the outdoors. Likewise, the techniques disclosed herein for communicating data to various agencies and/or sporting goods entities should not be construed as a generalized technique for communicating other (not related to the outdoors in some fashion) types of data over computer networks.

The invention claimed is:

1. A method performed by at least one computing device, the method comprising:
    obtaining training images of first fish, the training images having associated labels identifying first species of the first fish;
    obtaining training location information, the training location information corresponding to locations where the first fish were caught;
    training a classifier using the training images and the training location information;
    obtaining a target image of a second fish;
    obtaining target location information corresponding to a location where the second fish was caught; and
    determining a classification of the second fish using the trained classifier, the classification identifying a species of the second fish.

2. The method of claim 1, performed by a server device in communication with a client device.

3. The method of claim 2, wherein:
    the obtaining training images comprises obtaining the training images from first client devices by the server device,
    the obtaining the target image comprises obtaining the target image from a second client device by the server device, and
    the method further comprises sending the classification from the server device to the second client device.

4. The method of claim 1, wherein the training is performed on a server device that sends the trained classifier or trained parameters of the trained classifier to a second computing device, and the second computing device performs the determining.

5. The method of claim 4, wherein the second computing device comprises a client fishing application that obtains the target image from a camera of the second computing device and submits the target image with a catch report identifying the second species to the server computing device.

6. One or more hardware computer-readable memory devices or storage devices storing processor-executable instructions which, when executed by at least one hardware processing device, cause the at least one hardware processing device to perform acts comprising:
    obtaining training images of first fish, the training images having associated labels identifying first species of the first fish;
    obtaining training location information, the training location information corresponding to first locations where the first fish were caught;
    training a classifier using the training images and the training location information to perform species classification of second fish in one or more target images.

7. The one or more hardware computer-readable memory devices or storage devices of claim 6, the acts further comprising:
    obtaining an individual target image of an individual second fish;
    obtaining target location information corresponding to a second location where the individual second fish was caught; and
    determining a classification of a second species of the individual second fish using the trained classifier.

8. The one or more hardware computer-readable memory devices or storage devices of claim 7, the acts further comprising:
    accessing a remote server over a network to obtain a first item of training location information identifying, for a first time when an individual first fish was caught, historical salinity, water temperature, weather, or stream flows for an individual first location where the individual first fish was caught at the first time.

9. The one or more hardware computer-readable memory devices or storage devices of claim 8, the acts further comprising:
    accessing the remote server over the network to obtain an item of target location information identifying, for a second time when the second fish was caught, salinity, water temperature, weather, or stream flows for the second location where the individual second fish was caught at the second time.

10. The one or more hardware computer-readable memory devices or storage devices of claim 6, wherein the classifier comprises a neural network or a support vector machine.

11. The one or more hardware computer-readable memory devices or storage devices of claim 10, the acts further comprising:
    training another classifier using the training images and the training location information; and
    applying a decision technique to perform the species classification based on outputs of both the classifier and the another classifier.

12. The one or more hardware computer-readable memory devices or storage devices of claim 6, the acts further comprising:
    obtaining training image features for the training images; and
    training the classifier using the training image features.

13. The one or more hardware computer-readable memory devices or storage devices of claim 12, the acts further comprising:
    obtaining an individual target image of an individual second fish;
    obtaining target location information corresponding to a location where the individual second fish was caught;
    obtaining target image features of the individual target image; and
    determining a classification of a second species of the individual second fish by inputting the target location information and the target image features into the trained classifier.

14. A computing device comprising:
    at least one processing device; and
    at least one memory device or storage device storing executable instructions which, when executed by the at least one processing device, cause the at least one processing device to:
        obtain a target image of a first fish, the target image having corresponding target image features;
        obtain target location information corresponding to a target location where the first fish was caught; and
        determine a first species of the first fish using the target image features and the target location information, the first species being determined by:
            providing the target location information and at least one of the target image or the target image features to at least one trained classifier, the at least one trained classifier having been trained to perform fish species classification using labeled training images of fish and training location information associated with the labeled training images; and
            obtaining the first species from the at least one trained classifier.

15. The computing device of claim 14, wherein the executable instructions cause the at least one processing device to:

send the target location information and the at least one of the target image or the target image features to a server device that hosts the at least one trained classifier; and
receive the first species from the server device.

16. The computing device of claim 14, embodied as a client device, wherein the executable instructions cause the at least one processing device to:
obtain the at least one trained classifier from one or more server devices; and
apply the at least one trained classifier locally on the client device to determine the first species.

17. The computing device of claim 14, wherein the executable instructions cause the at least one processing device to:
submit a catch report to one or more server devices, the catch report including the target image and identifying the first species and the target location.

18. The computing device of claim 17, wherein the executable instructions cause the at least one processing device to:
display the first species on a display of the client device with a request for user confirmation that the first fish actually the first species;
receive, via the display, a confirmation that the first fish is actually the first species; and
responsive to receiving the confirmation, submit the catch report to the one or more server devices.

19. The computing device of claim 14, embodied as a server device, wherein the executable instructions cause the at least one processing device to:
obtain the target image from a first client device; and
send the first species to the first client device.

20. The computing device of claim 19, wherein the executable instructions cause the at least one processing device to:
receive, from the first client device, a confirmation that the first species is the correct classification of the first fish;
responsive to receiving the confirmation, update a training set for the at least one trained classifier using the target image, the target location information, and the first species; and
update the at least one trained classifier using the updated training set.

* * * * *